(12) United States Patent
Smasal et al.

(10) Patent No.: US 7,585,345 B2
(45) Date of Patent: Sep. 8, 2009

(54) BAFFLE FILTER

(75) Inventors: Richard D. Smasal, Afton, MN (US);
Majid Entezarian, Hudson, WI (US);
Thomas M. Fitch, St. Paul, MN (US);
Justin C. Peskar, Inner Grove Heights, MN (US); Bradley Heckendorf, Menomonie, WI (US)

(73) Assignee: Phillips Plastics Corporation, Phillips, WI (US)

( * ) Notice: Subject to any disclaimer, the term of this patent is extended or adjusted under 35 U.S.C. 154(b) by 554 days.

(21) Appl. No.: 11/275,627

(22) Filed: Jan. 19, 2006

(65) Prior Publication Data

US 2007/0163216 A1    Jul. 19, 2007

(51) Int. Cl.
*B01D 45/00* (2006.01)

(52) U.S. Cl. .............................. 55/443; 55/445; 55/446

(58) Field of Classification Search .................. 55/321, 55/442–446, 467, 482, 486–500, 511, 517–518, 55/529, DIG. 3, DIG. 12, DIG. 5, DIG. 37, 55/521; 210/493.1, 493.5
See application file for complete search history.

(56) References Cited

U.S. PATENT DOCUMENTS

| | | | | |
|---|---|---|---|---|
| 499,799 A | | 6/1893 | Parkinson | |
| 1,400,860 A | | 12/1921 | Brown | |
| 2,422,527 A | * | 6/1947 | Campbell | 55/444 |
| 2,424,219 A | * | 7/1947 | Black | 55/418 |
| 2,474,540 A | * | 6/1949 | Marsh | 55/444 |
| 2,523,529 A | * | 9/1950 | Zwickl | 55/428 |
| 3,566,585 A | * | 3/1971 | Voloshen et al. | 55/435 |
| 3,813,856 A | * | 6/1974 | Jensen | 55/444 |
| 3,834,135 A | * | 9/1974 | Jordan | 55/444 |
| 3,870,494 A | * | 3/1975 | Doane | 55/443 |
| 3,910,782 A | * | 10/1975 | Struble et al. | 55/444 |
| 3,932,151 A | * | 1/1976 | Lau | 96/325 |
| 3,955,949 A | | 5/1976 | Rohrer | |
| 4,008,060 A | * | 2/1977 | Andreae | 55/446 |
| 4,105,422 A | * | 8/1978 | Kiguchi | 55/446 |
| 4,690,701 A | | 9/1987 | Hedrick et al. | |
| 4,854,949 A | | 8/1989 | Giles, Sr. et al. | |
| 4,872,892 A | | 10/1989 | Vartiainen et al. | |
| D336,678 S | | 6/1993 | Finkelstein et al. | |
| 5,302,174 A | * | 4/1994 | Guetersloh | 55/444 |
| 5,318,609 A | * | 6/1994 | Kittler | 55/443 |

(Continued)

FOREIGN PATENT DOCUMENTS

GB        2 116 873 A        10/1983

(Continued)

*Primary Examiner*—Duane Smith
*Assistant Examiner*—Dung Bui
(74) *Attorney, Agent, or Firm*—Holland & Hart LLP

(57) ABSTRACT

Various embodiments of a filter are described herein. In one embodiment, a filter includes a first side and a second side both of which have openings therein. A plurality of baffle members are positioned between the first side and the second side. The plurality of baffle members may be provided as separate pieces or as part of a baffle element. The filter may be used to remove grease from cooking exhaust in residential or commercial kitchen environments. In another embodiment, the filter includes a first side which has a plurality of entry openings in it and a plurality of baffle members which define a plurality of exit openings where air exits the filter.

40 Claims, 24 Drawing Sheets

U.S. PATENT DOCUMENTS

| | | |
|---|---|---|
| 5,342,422 A | 8/1994 | Wimböck |
| 5,352,257 A * | 10/1994 | Powers ........................ 55/444 |
| 5,536,288 A * | 7/1996 | De Witt et al. ................ 55/440 |
| 5,679,120 A | 10/1997 | Yamada et al. |
| 5,687,707 A | 11/1997 | Prasser |
| 6,251,153 B1 | 6/2001 | Neitzel et al. |
| 6,290,742 B1 * | 9/2001 | Pakkala et al. ................ 55/443 |
| 6,454,825 B1 | 9/2002 | Cheimets et al. |
| 6,573,479 B2 * | 6/2003 | Arntz et al. .................. 219/400 |
| 6,585,793 B2 * | 7/2003 | Richerson et al. ............. 55/521 |
| 6,656,244 B1 | 12/2003 | Galassi |
| 6,719,830 B2 * | 4/2004 | Illingworth et al. ........... 95/270 |
| 6,790,397 B2 * | 9/2004 | Richerson et al. ........... 264/154 |
| 6,797,041 B2 | 9/2004 | Brownell et al. |
| 6,814,783 B2 | 11/2004 | Fitch et al. |
| 6,833,022 B2 * | 12/2004 | Feisthammel et al. .......... 95/91 |
| 6,994,743 B2 * | 2/2006 | Brownell et al. .............. 95/268 |
| 7,004,988 B2 * | 2/2006 | Letzel ........................ 55/444 |
| 7,041,159 B2 * | 5/2006 | Entezarian et al. ............ 96/135 |
| 7,166,140 B2 * | 1/2007 | Entezarian et al. ............ 55/320 |
| 7,422,613 B2 * | 9/2008 | Bockle et al. ................. 55/318 |
| 2005/0000199 A1 * | 1/2005 | Carter ........................ 55/442 |
| 2005/0002833 A1 | 1/2005 | Fitch et al. |
| 2005/0016376 A1 | 1/2005 | Fitch et al. |
| 2005/0028498 A1 | 2/2005 | Entezarian et al. |

FOREIGN PATENT DOCUMENTS

WO      WO 02/070105 A2      9/2002

\* cited by examiner

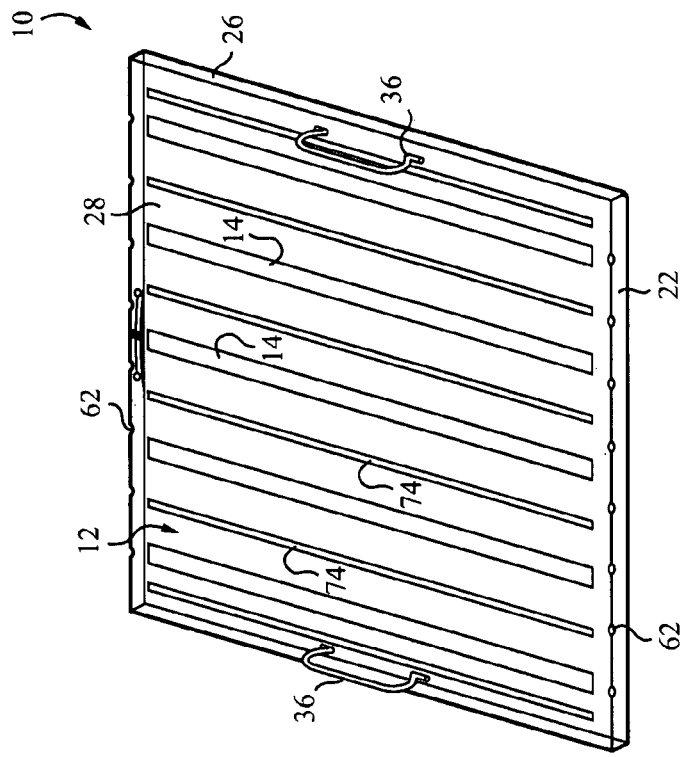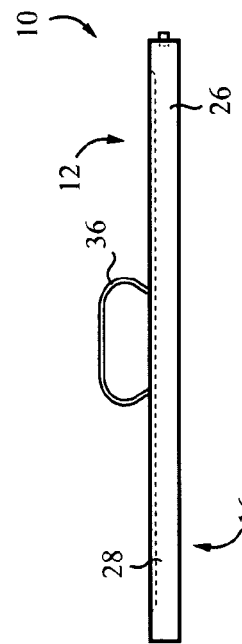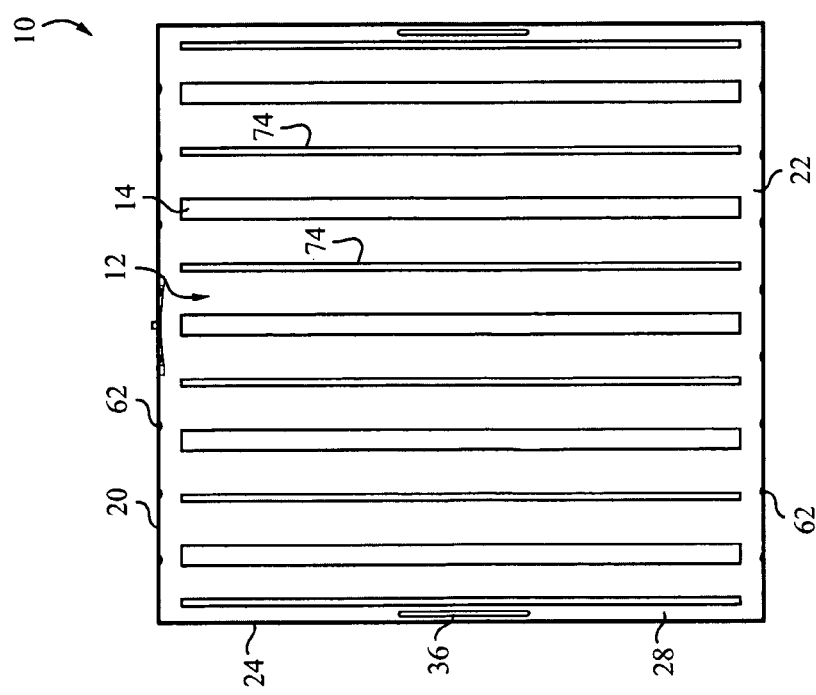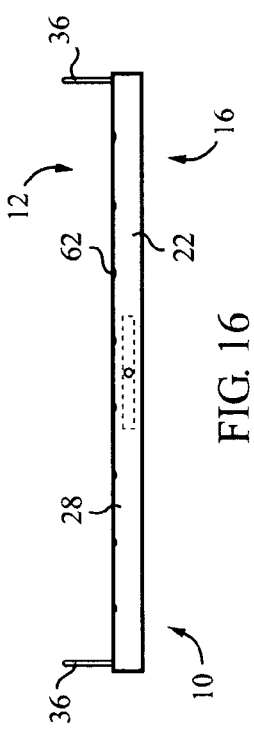
FIG. 13
FIG. 15
FIG. 14
FIG. 16

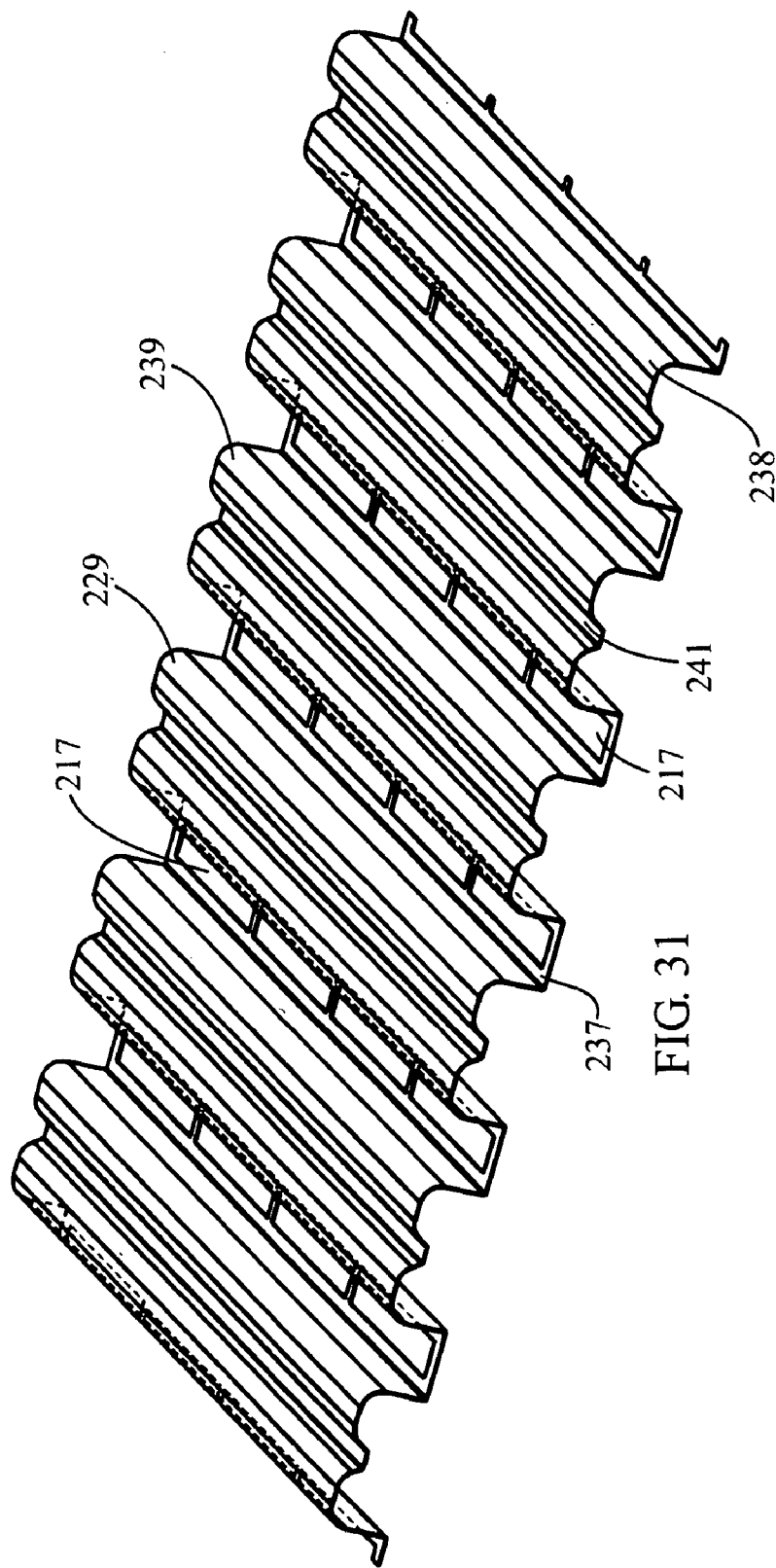
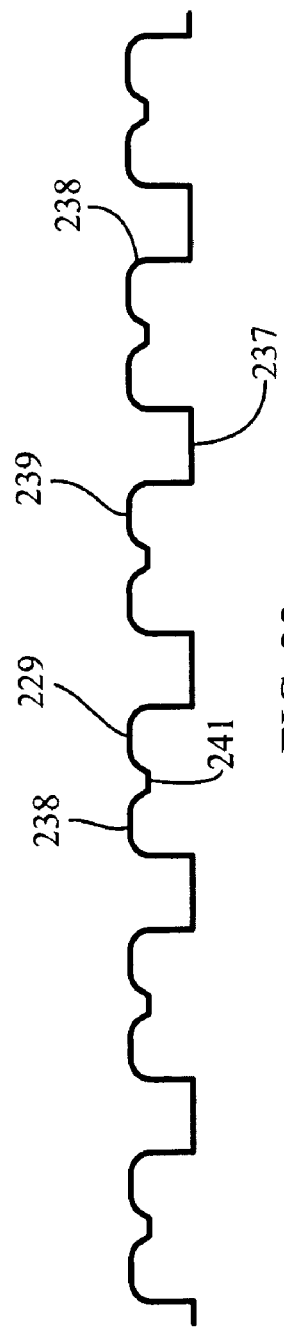
FIG. 31
FIG. 32

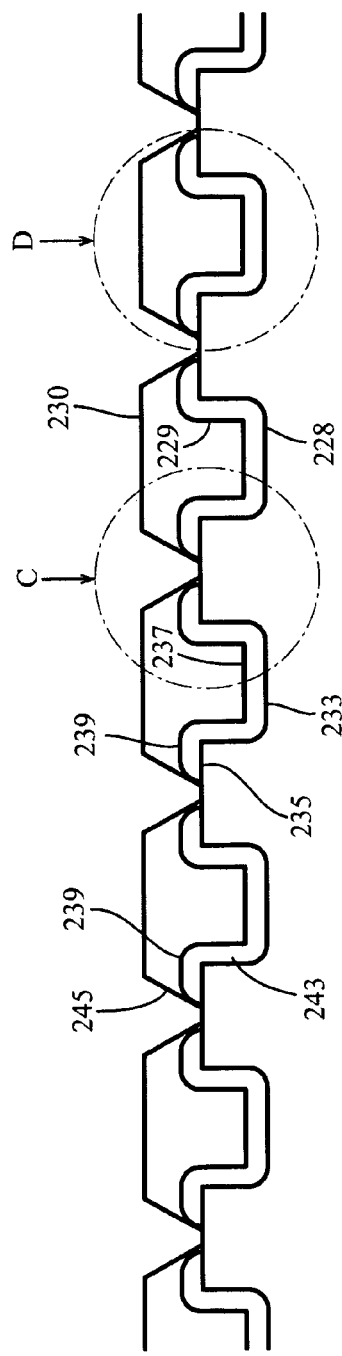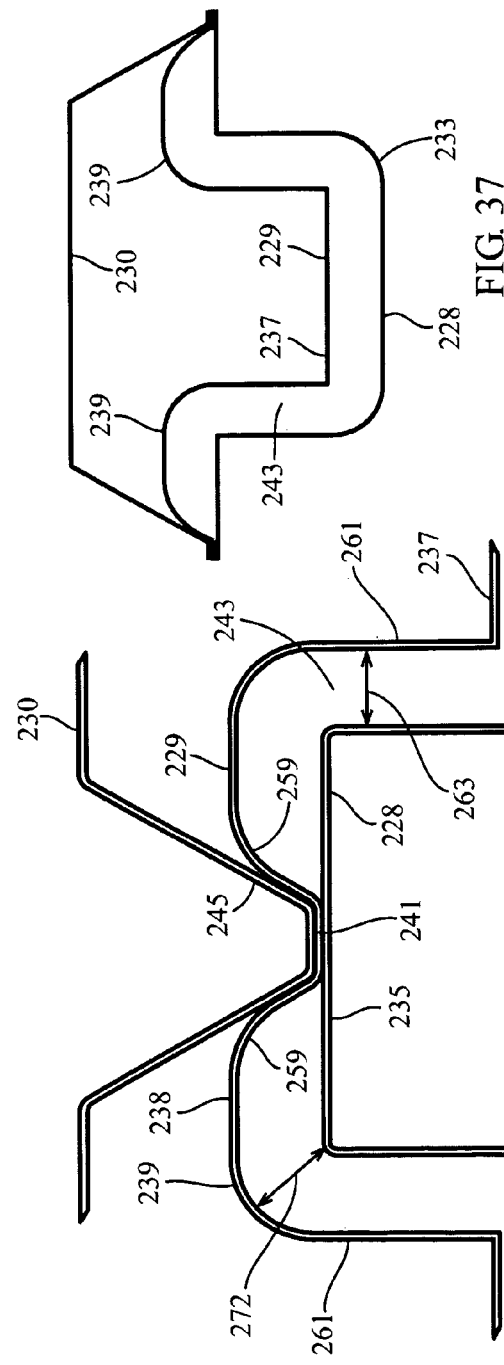

BAFFLE FILTER

BACKGROUND

Grease and other impurities such as smoke, soot, and the like are emitted into the air when foods that contain oily substances are cooked. When these types of food are cooked indoors, a ventilation system is often used to channel the cooking exhaust out of the building and into the atmosphere. In an effort to prevent the buildup of grease and other impurities on the interior of ventilation system (e.g., the hood, ductwork, fan, etc.), the air may be filtered using mesh or baffle filters before or shortly after entering the ventilation system. If the grease is not filtered out of the exhaust stream, it may build up on the inside of the ventilation system. Grease build-up in the ventilation system may create a dangerous fire situation or a situation which is unsanitary for a cooking environment. Also, if the grease isn't filtered out of the air, the grease may accumulate near the exit of the ventilation system (e.g., the roof of the building).

Many kitchen ventilation systems include a hood and ductwork which extend from the hood to the exterior of the building. Baffle filters used with these hoods generally operate by deflecting the cooking exhaust flow as it passes through the baffle so that heavier substances (e.g. liquids such as grease, solids, etc.) impact the surface of the baffle. After impacting the surface of the baffle, these substances drain to a collection area. In addition to filtering grease, the baffle filters are often required by local laws or generally agreed upon standards to have a minimum level of flame retarding capability. Thus the baffle filter may be used to prevent flare-ups on the cooking surface or other fires that may occur from easily spreading into the ductwork.

Unfortunately, conventional baffle filters suffer from a number of deficiencies. For example, in many conventional baffle filters, the capture efficiency and flame retarding capability of the baffle filter are relatively low. As a result of the low capture efficiency, these filters generally capture only larger substances and allow more impurities to pass through the filters and deposit in the ductwork. The ductwork may require more frequent cleaning and maintenance as a result, which, in turn, increases the costs of operating and maintaining the facility.

Accordingly, it would be advantageous to provide an improved baffle filter which is capable of higher capture efficiencies and/or flame retarding capability than many of the presently available baffle filters. It would also be desirable to provide a baffle filter that is economical and easy to use.

DRAWINGS

FIGS. 13-16 show a perspective view, a front view, a side view, and a bottom view, respectively, of another embodiment of a baffle filter.

FIG. 31 shows a perspective view of one embodiment of a baffle element used in a baffle filter.

FIG. 32 shows a cross-sectional view of the baffle element from FIG. 31.

FIG. 35 shows a cross-sectional view of the baffle filter from FIG. 26.

FIGS. 36-37 show larger cross-sectional views of various portions of the baffle filter from FIG. 35.

DETAILED DESCRIPTION

Figure 1:
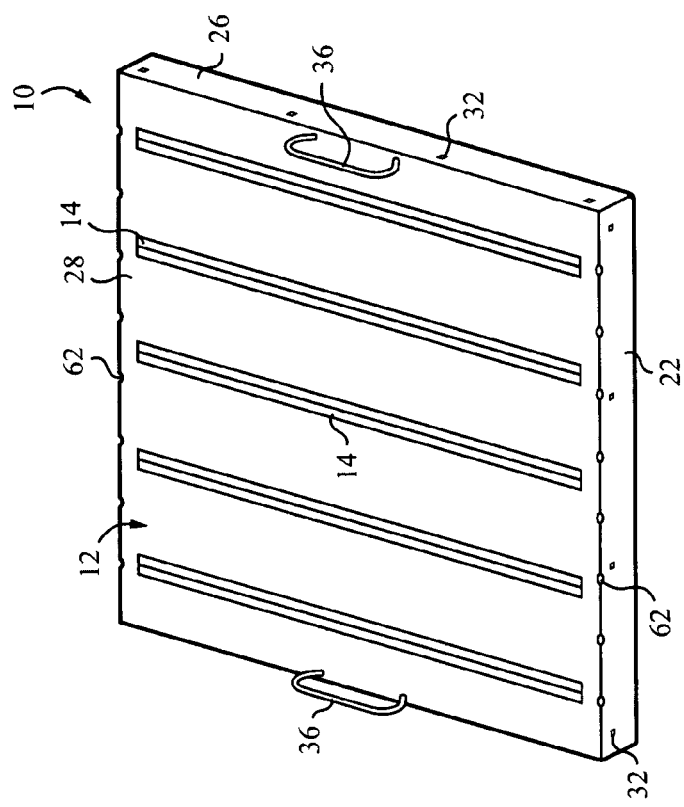
FIGS. 1-4 show a perspective view, a front view, a side view, and a bottom view, respectively of one embodiment of a baffle filter.
Figure 3:
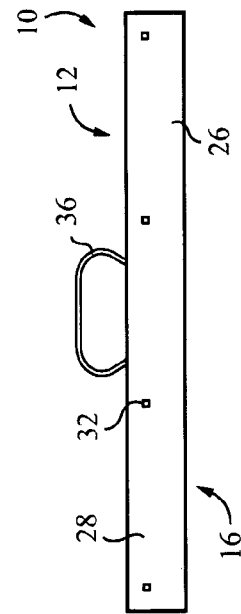

Although the baffle filter is described herein in the context of ventilation systems used in a kitchen setting, it should be understood that the concepts and features described herein may be used in a variety of settings and situations as would be recognized by those of ordinary skill in the art. Also, it should be understood, that the features, advantages, characteristics, etc. of one embodiment may be applied to any other embodiment to form one or more additional embodiments unless noted otherwise.

Referring to FIGS. 1-6, various views of one embodiment of a baffle filter 10 are shown. In general, the baffle filter 10 has a front or first side which has a plurality of elongated entry openings 14 and a rear or second side 16 which also has a plurality of elongated exit openings 18. The baffle filter 10 also includes a top side 20, a bottom side 22, a first side wall 24, and a second side wall 26. The baffle filter 10 may be square, rectangular, or any other suitable shape. In one embodiment, the baffle filter 10 has a polygonal shape.

In the embodiment shown in FIGS. 1-6, the baffle filter 10 includes a first frame element 28, a second frame element 30, and a plurality of baffle members 38. The frame elements 28, 30 cooperate together to form the frame of the baffle filter 10. The first frame element 28 may be shaped similar to a rectangular box with the rear side being open and capable of receiving or being coupled to the second frame element 30. The second frame element 30 may be substantially planar and capable of being inserted into the first frame element 28. In this embodiment, the first frame element 28 forms the front side 12, the top side 20, the bottom side 22, the first side wall 24, and the second side wall 26 of the baffle filter 10. The second frame element 30 forms most or all of the rear side 16 of the baffle filter 10. Once the frame elements 28, 30 have been coupled together, the openings 14 in the front side 12 of the frame are positioned opposite the openings 18 in the rear side 16 of the frame.

Figure 4:
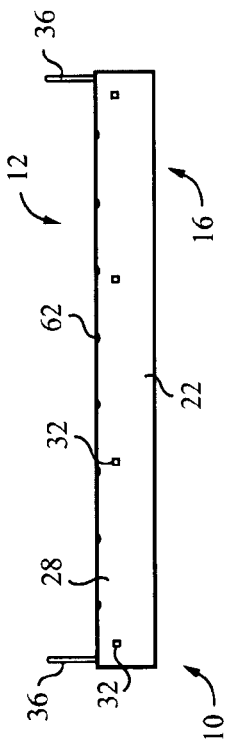
Figure 5:
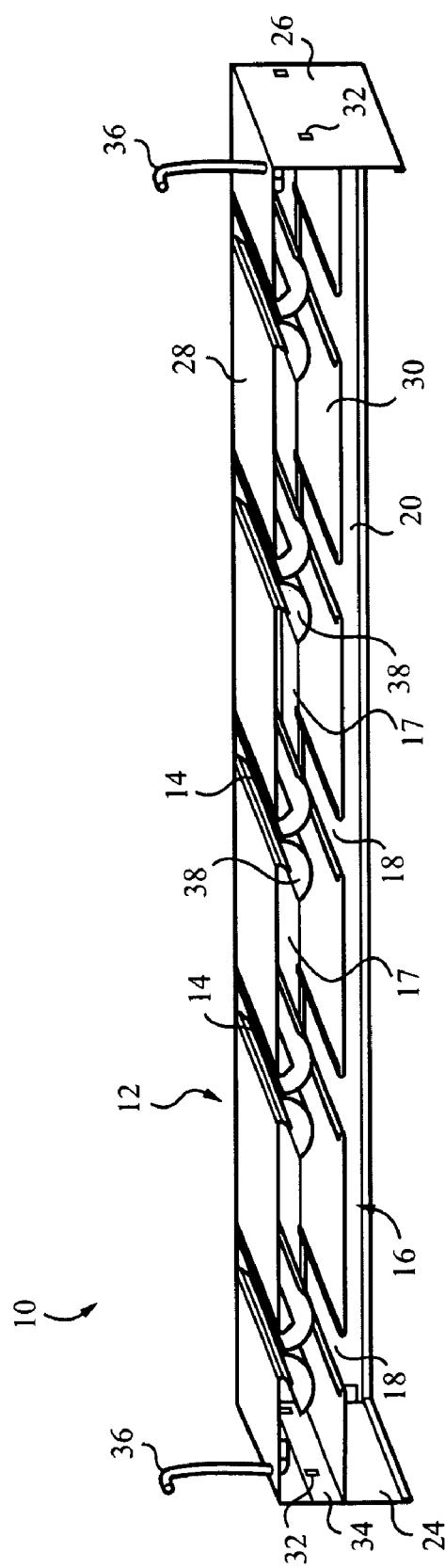
FIGS. 5-6 show cut-away perspective views of the baffle filter from FIG. 1

The frame elements 28, 30 may be coupled together in any suitable manner. For example, as shown in FIG. 5, the edges 34 of the second frame element 30 are bent so that they are parallel to the first side wall 24. The edges 34 of the second frame element 30 and the first side wall 24 of the first frame element 28 are spot welded together as shown by reference numerals 32 in FIGS. 1 and 3-5. It should be appreciated that the frame elements 28, 30 may be coupled together in many other ways besides welding. For example, bolts, clips, fasteners, etc. may all be used to couple the frame elements 28, 30 together. In one embodiment, the frame elements 28, 30 may be coupled together in an easily releasable manner to allow the frame to be taken apart for cleaning. It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members and any additional intermediate member being attached to one another. Such joining may be permanent in nature or alternatively may be removable or releasable in nature.

It should be appreciated that the frame elements 28, 30 may be configured in any of a number of suitable ways. For example, in another embodiment, the second frame element 30 may be shaped similar to a rectangular box having one side which is open and configured to receive the first frame element 28, which is planar shaped. In this embodiment, the first frame element 28 forms the front side 12 and the second frame element 30 forms the rear side 16, the top side 20, the bottom side 22, the first side wall 24, and the second side wall 26. Further embodiments may also be provided such as where the frame of the baffle filter 10 includes a single unitary frame element or more than two frame elements.

The baffle filter 10 may be used in a variety of situations and configurations. The most common use of the baffle filter 10 is with a kitchen ventilation system which may include a kitchen hood. The baffle filter 10 may be used with the ventilation system to remove impurities such as grease, soot, etc. from an air flow (e.g., cooking exhaust). The ventilation systems that the baffle filter 10 may be used with include ventilation systems which: recirculate air, output the air into the atmosphere, include a hood, do not include a hood, etc.

In one embodiment, the baffle filter 10 may be sized and configured to fit between the rails (typically, but not always, U-shaped) of a conventional kitchen hood which is positioned above a stove or other cooking area. The cooking area may be used to cook fatty foods and/or cook foods in grease (e.g., French fries, etc.). The manner in which a filter fits between the rails of a kitchen hood is explained in U.S. patent application Ser. No. 10/632,805, published as U.S. Patent Application Publication No. 2005/0028498, entitled "Separation Apparatus," filed on Aug. 4, 2003, the contents of which are incorporated by reference herein in its entirety (all drawings and text of the patent application). In many conventional kitchen hoods the rails used to hold the filters are spaced apart about 2 inches (4.76 cm). Thus, those embodiments of the baffle filter 10 that are intended for use with conventional kitchen hoods may be configured to have a depth of about 1.5 to 2 inches (3.81 cm to 5.08 cm) or desirably about 1⅞ inches. The baffle filter 10 in FIGS. 1-6 shows one embodiment that may fit between the rails of a conventional kitchen hood. The baffle filter 10 may also include handles 36 which may be useful to position the baffle filter 10 in a hood or other ventilation system.

Figure 6:
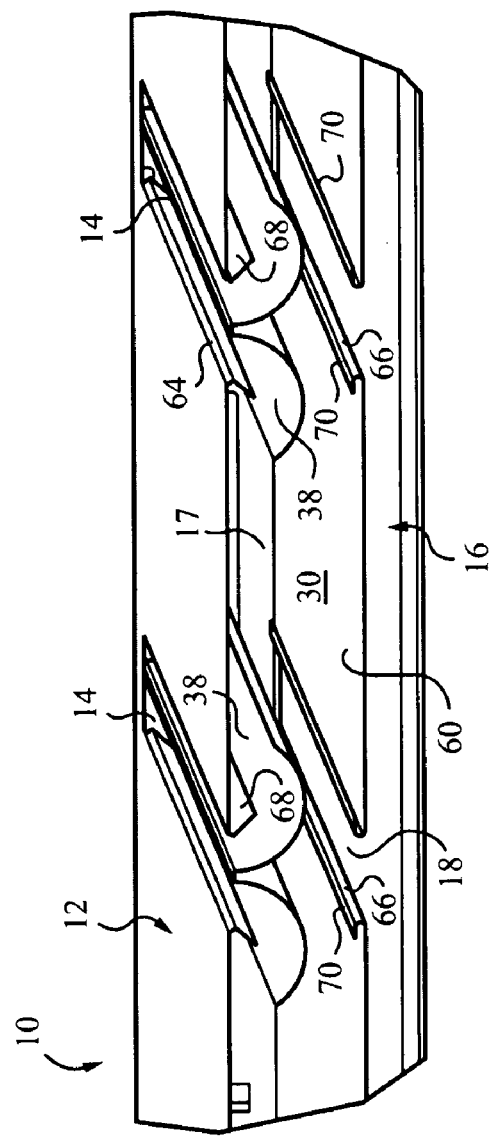

Referring to FIGS. 5-6, the baffle members 38 are positioned between opposing openings 14, 18 in the front side 12 and rear side 16, respectively, of the baffle filter 10. In general, the baffle members 38 extend longitudinally from the top side 20 to the bottom side 22 of the baffle filter 10. Also, the baffle members 38 are generally parallel to the openings 14, 18. The baffle members 38 are used to deflect an air flow which passes through the openings 14, 18 and thus separate impurities from the air flow.

The baffle members 38 are positioned so that adjacent baffle members 38 define openings 17. The baffle members 38 in the embodiment shown in FIGS. 5-9 are separate pieces. It should be appreciated, however, that the baffle members 38 may be part of an integral baffle element that is positioned between the front side 12 and the rear side 16 and has a plurality of openings (e.g., elongated) in it (e.g., a plate with a plurality of openings in it).

As shown in FIGS. 5-8, the baffle members 38 may each have a cross section that is substantially W shaped. As used herein, the term "W shaped" should be understood to be a broad term with the only requirement being that the item being so described has two trough areas (the bottom two portions of the W) and three raised areas (the top three portions of the W) where one of the raised areas is between the two trough areas and the other two raised areas are on the outer side of each trough area. The depth of the trough areas and the height of the raised areas is unimportant so long as the areas exist. Also, the W shaped item need not have a smooth curved shape but can also have a jagged shape as long as it has the trough areas and raised areas.

The use of W shaped baffle members 38 may be desirable to decrease the pressure drop through the baffle filter 10. As shown in FIGS. 5-8, the baffle members 38 are configured so that at least a portion of each baffle member 38 is positioned between the openings 14 in the front side 12 and the openings 18 in the rear side 16 and is not parallel to the front side 12 and/or the rear side 16 of the baffle filter 10. It should be noted that the portion of each baffle member 38 is referred to as not being parallel to the general plane defined by the length and height (not depth) of the front side 12 and/or the general plane defined by the length and height of the rear side 16 and not by any particular surface taken along of the sides 12, 16. For example, the front side 12 and/or the rear side 16 may have numerous cavities and/or protrusions (large or small cavities or protrusions), however, the general plane defined by the front side 12 and/or the rear side 16 is that plane that is defined by the general length and height of the sides 12, 16. In most instances, the general plane defined by the front side 12 and/or the rear side 16 is the same as the plane defined by the length and height of the baffle filter 10 taken as a whole.

In one embodiment, the baffle members 38 may be configured so that each baffle member includes a first portion and a second portion both of which extend toward either the front side 12 or the rear side 16. For example, the two raised areas on the outer side of each trough area of the substantially W shaped baffle members may be the first and second portions since they both extend toward either the front side 12 or the rear side 16. Numerous other embodiments may also be used.

Figure 7:
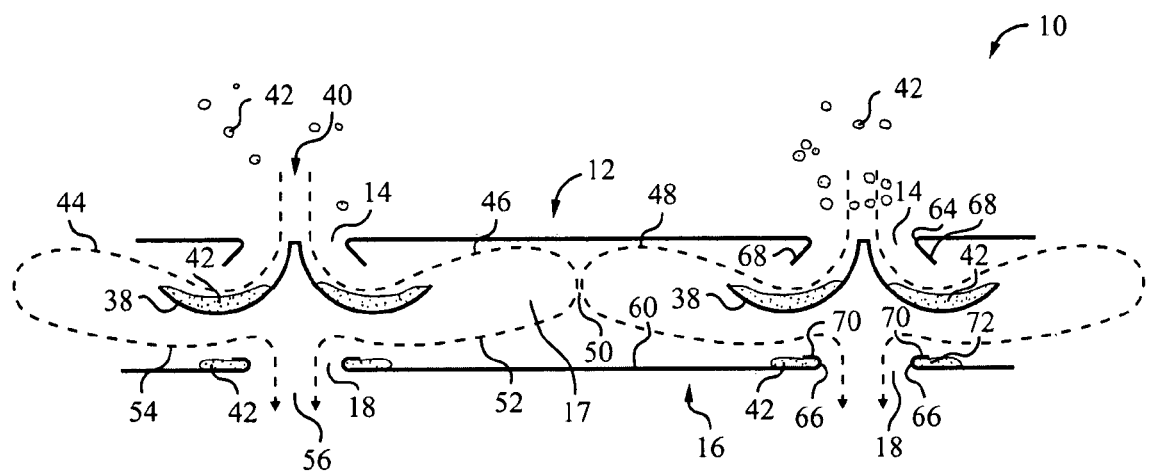
FIGS. 7-8 show an air flow as it travels through another embodiment of a baffle filter.
Figure 8:
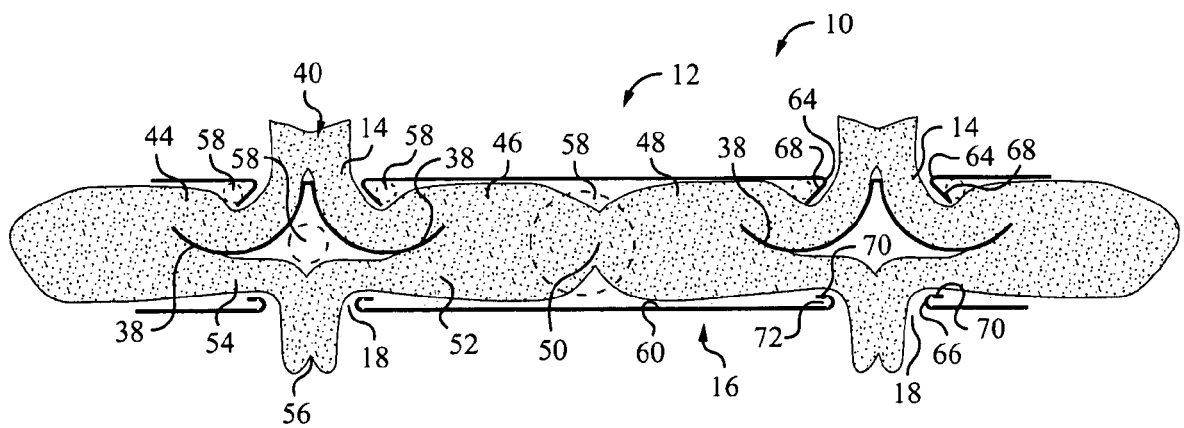

FIGS. 7-8 show the path of an air flow 40 as it passes through the baffle filter 10. The air flow 40 includes impurities 42 which are entrained in the air flow 40. The impurities 42 may be in the form of fine or coarse solids (e.g., soot, etc.) or liquids (e.g., aerosols of grease, oil, etc.). The air flow 40 travels on a path through the baffle filter 10 that causes the air flow 40 to change directions multiple times so that the impurities 42, which are generally heavier than the air in the air flow 40, impact surfaces inside the baffle filter 10 and drain away to a collection area.

As the air flow 40 enters the baffle filter 10 through the openings 14 in the front side 12, the air flow 40 is divided into a first air flow 44 and a second air flow 46 by the baffle member 38. The first air flow 44 and the second air flow 46 travel away from each other and combine with adjacent air flows. For example, as shown in FIG. 7, the second air flow 46 combines with adjacent air flow 48 to form a third air flow 50. The third air flow 50 and the air flow resulting from the combination of the first air flow 44 and an adjacent air flow are each divided to form additional air flows—two of which are shown as air flows 52, 54 in FIGS. 7-8. Air flows 52, 54 combine to form another air flow 56 which exits the baffle filter 10 through opening 18 in the rear side 16.

The air flow 40 which enters the baffle filter 10 is divided, mixed, divided, and mixed before exiting the baffle filter 10. This type of action may be useful to promote flame control by quenching a hot flame or providing air for more complete combustion. Thus, the baffle filter 10 may be provided with increased capability to control flames with the net effect being that the length of the flame extending out of the rear side 16 of the baffle filter 10 is shortened. Referring still to FIGS. 7-8, the air flow 40 forms recirculation zones 58 in the baffle filter 10 which also promote combustion and mixing.

Figure 2:
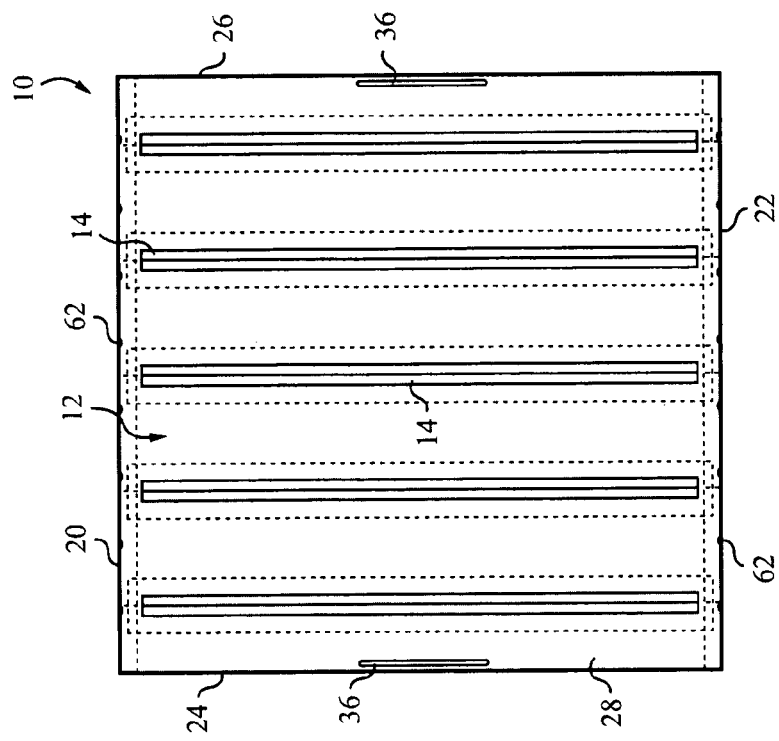

As shown in FIG. 7, the impurities 42 collect primarily on the baffle members 38 and an interior surface 60 of the rear side 16 of the baffle filter 10. The impurities move downward and exit the baffle filter 10 through openings 62 (FIG. 1-2, 4). As shown in FIG. 1, both the top side 20 and the bottom side 22 include the openings 62 so that the baffle filter 10 can be used as shown or upside down.

Figure 9:
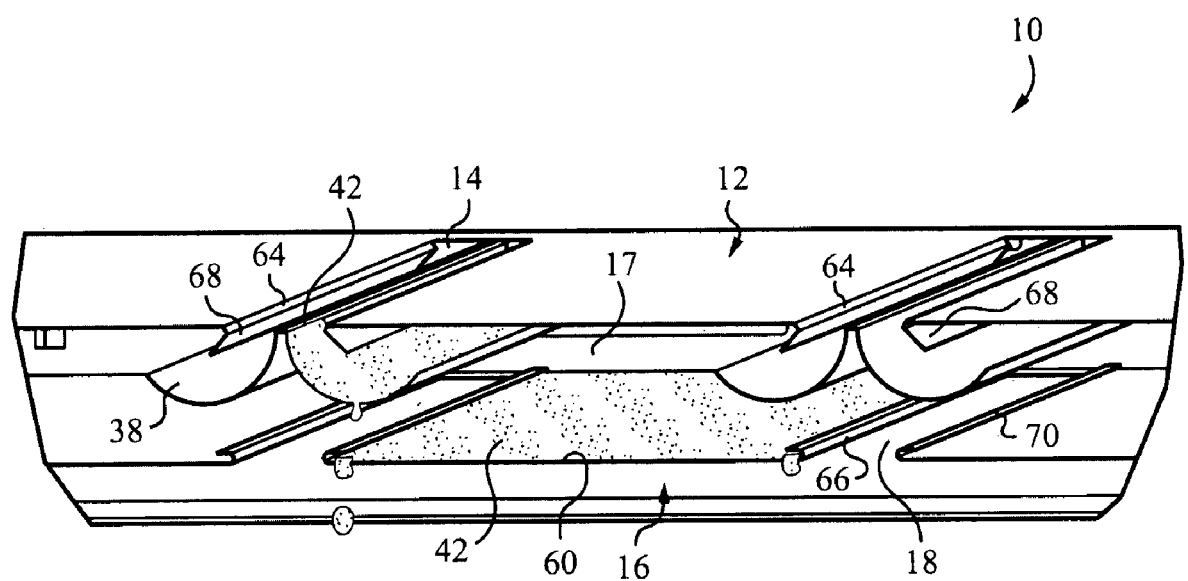
FIG. 9 shows a cut-away perspective view of the baffle filter from FIG. 1 as it collects impurities.
Figure 10:
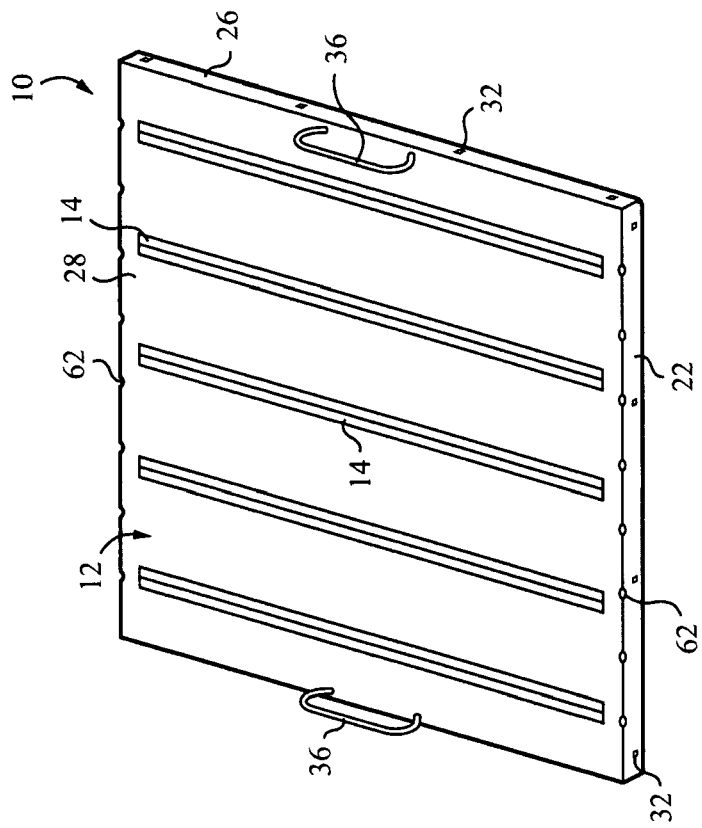
FIGS. 10-12 show a perspective view, a front view, and a side view, respectively, of another embodiment of a baffle filter.
Figure 12:
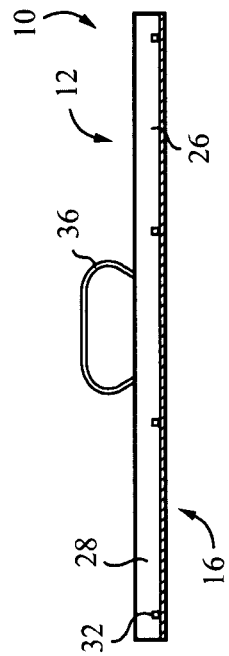
Figure 11:
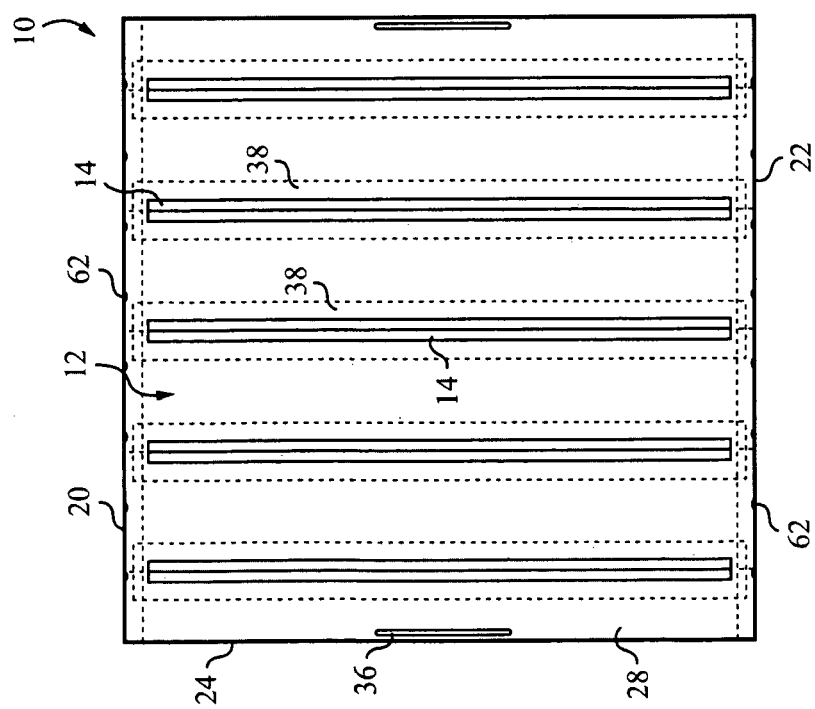

Referring back to FIGS. 7-8, the front side 12 and the rear side 16 each include edges 64, 66, which define the openings 14, 18, respectively. The edges 64, 66 include flanges, rims, lips 68, 70, respectively, which extend in towards the interior of the baffle filter 10. The flanges 68 may be useful to channel the air flow 40 as it passes through the openings 14 in the front side 12. The flanges 70 may be useful to facilitate draining of the impurities 42 which impact the interior surface 60 of the rear side 16. The flanges 70 define channels 72, which serve to prevent the impurities 42 from passing through the openings 18 due to the force of the adjacent air flow traveling through the openings 18. Instead of passing through the openings 18, the impurities 42 enter the channel 72 defined by the flanges 70 and travel downward where the impurities 42 exit the baffle filter 10 through openings 62 (FIG. 1). FIG. 9 shows a perspective view of the impurities 42 draining off of the baffle members 38 and the interior surface 60 of the rear side 16. As shown in FIGS. 7-9, the flanges 68, 70 are each positioned so that the flange forms an acute angle relative to the interior surface of the respective side 12, 16 that the flange is on. The flanges 68, 70 may also be viewed as forming an obtuse angle relative to the openings 14, 18, respectively. The use of an acute angle may be especially desirable on edges 66 to prevent the impurities 42 from traveling over the flange 70 and out the opening 18 in the rear side 16.

In another embodiment, a separation cartridge may be formed by combining the baffle filter 10 with a packed bed of particles in a manner similar to that described in any of the embodiments of U.S. patent application Ser. No. 10/632,805, published as U.S. Patent Application Publication No. 2005/0028498, entitled "Separation Apparatus," filed on Aug. 4, 2003; U.S. Pat. No. 6,814,783, entitled "Filtration media of Porous Inorganic Particles," filed on Mar. 14, 2003; International Patent Application No. PCT/US02/05753, published as WO 02/070105, entitled "Filtration Media of Porous Inorganic Particles," filed on Feb. 28, 2002; U.S. Provisional Patent Application No. 60/272,044, entitled "Filtration Media of Porous Inorganic Particles," filed on Mar. 1, 2001; and U.S. patent application Ser. No. 10/076,144, entitled "Filtration Media of Porous Inorganic Particles," filed on Feb. 15, 2002, each of which is hereby incorporated by reference in its entirety (all text and drawings). For example, the embodiment of the baffle filter 10 shown in FIG. 5 includes some extra space which is still inside the first frame element 28 in the area where the air flow exits the openings 18 in the rear side 16. A packed bed may be positioned in this extra space to provide additional filtering capabilities. The packed bed may be positioned to contact or very nearly contact the rear side 16 or may be positioned to provide space between the packed bed and the rear side 16.

FIGS. 10-16 show additional embodiments of the baffle filter 10. The baffle filter 10 shown in FIGS. 10-16 does not include the extra space defined by the first frame element 28. Thus the baffle filter 10 has less depth than the embodiment shown in FIGS. 1-9. In one embodiment, the baffle filter 10 may be about 1.25 inches (i.e., 3.175 cm) to 0.5 inches (i.e., 1.27 cm) deep, or about 1 inch (i.e., 2.45 cm) to 0.75 inches (i.e., 1.91 cm) deep, or, desirably, about ⅞ inches (i.e., 2.146 cm) deep. In the embodiment shown in FIGS. 13-16, the baffle filter 10 includes ridges 74 in the front side 12 and/or the rear side 16. The ridges 74 provide additional strength to the sides 12, 14 of the baffle filter.

Figure 17:
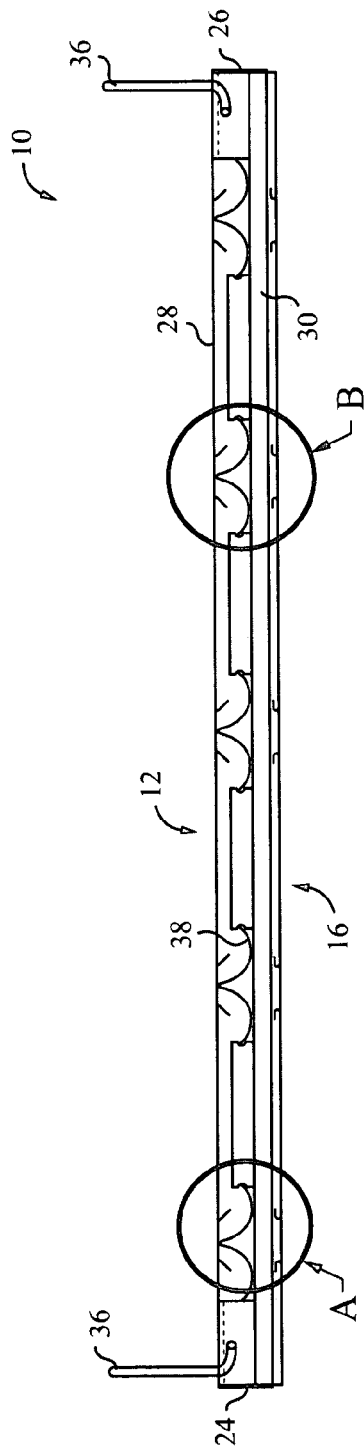
FIGS. 17-19 show cross sectional views of another embodiment of a baffle filter.
Figure 19:
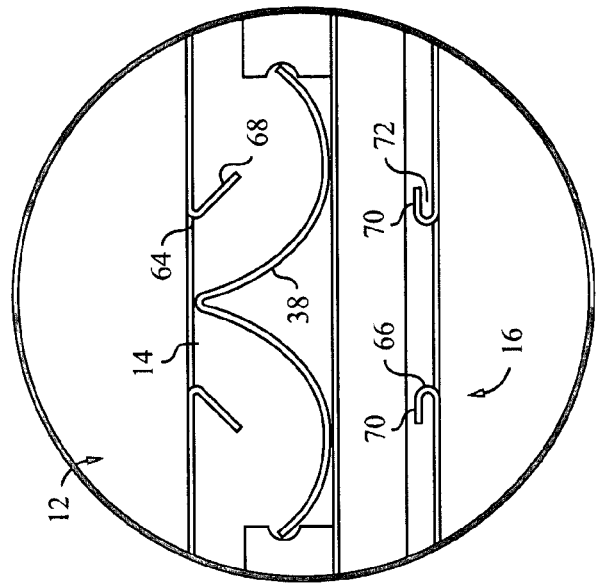
Figure 18:
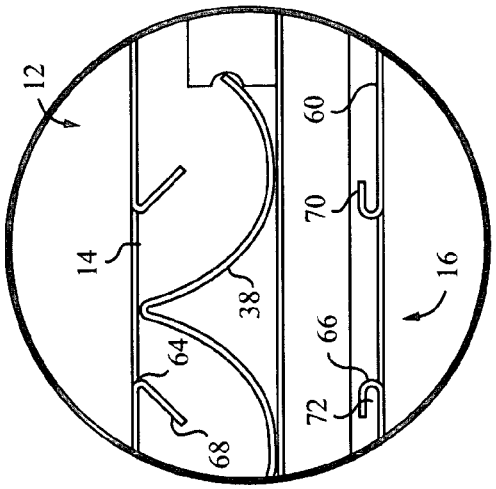
Figure 20:
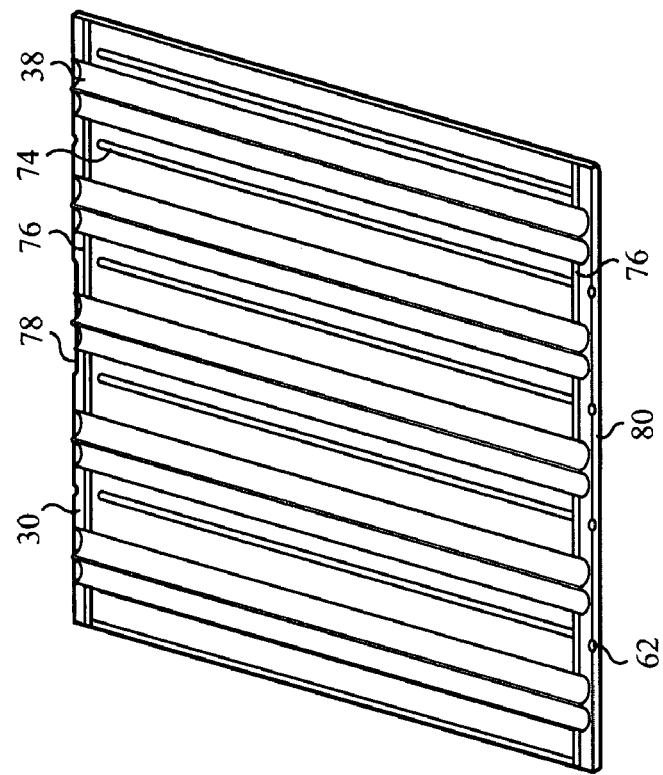
FIGS. 20-22 show a perspective view, a front view, and a bottom view, respectively, of a frame element used with one embodiment of a baffle filter.

Referring to FIGS. 17-23, the arrangement and configuration of the baffle members 38 in the baffle filter 10 is shown in greater detail. FIG. 17 shows a cross sectional view of the baffle filter 10. FIGS. 18 and 19 show blown up views of sections A, B, respectively from FIG. 17. Section A of FIG. 17 shows the baffle member 38 that is positioned adjacent to the first side wall 24 and section B of FIG. 17 shows the baffle member 38 that is positioned with other baffle members 38 on each side. As shown in FIG. 18, the baffle member 38 which is adjacent to the first side wall 24 is not positioned directly in the center of the opening 14 in the front side 12. Instead, the baffle member 38 is positioned slightly to the left of center of the opening 14 so that more of the air flow that passes through the opening 14 travels to the right of the baffle member 38. The baffle member 38 is configured this way because the air flow that goes to the left of the baffle member 38 does not mix with an adjacent air flow and does not have as much space to flow through as the air flow that flows to the right of the baffle member 38. However, as shown in FIG. 19, the baffle member 38 that is in between other baffle members 38 is positioned so that it is directly in the center of the opening 14. Thus, the air flow that enters the opening in FIG. 19 should split evenly.

Figure 21:
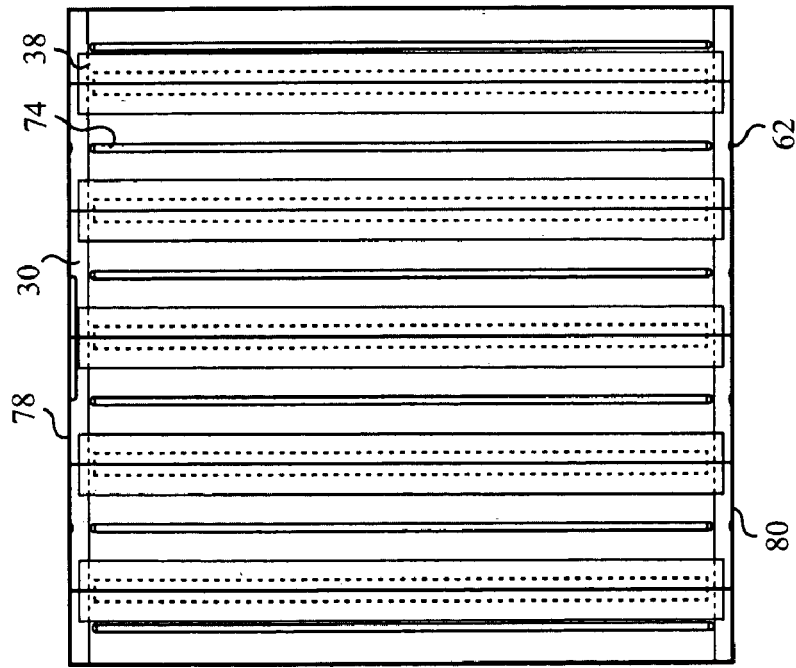
Figure 22:
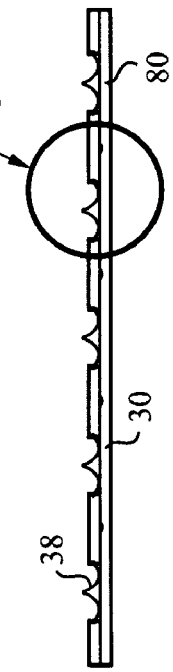
Figure 23:
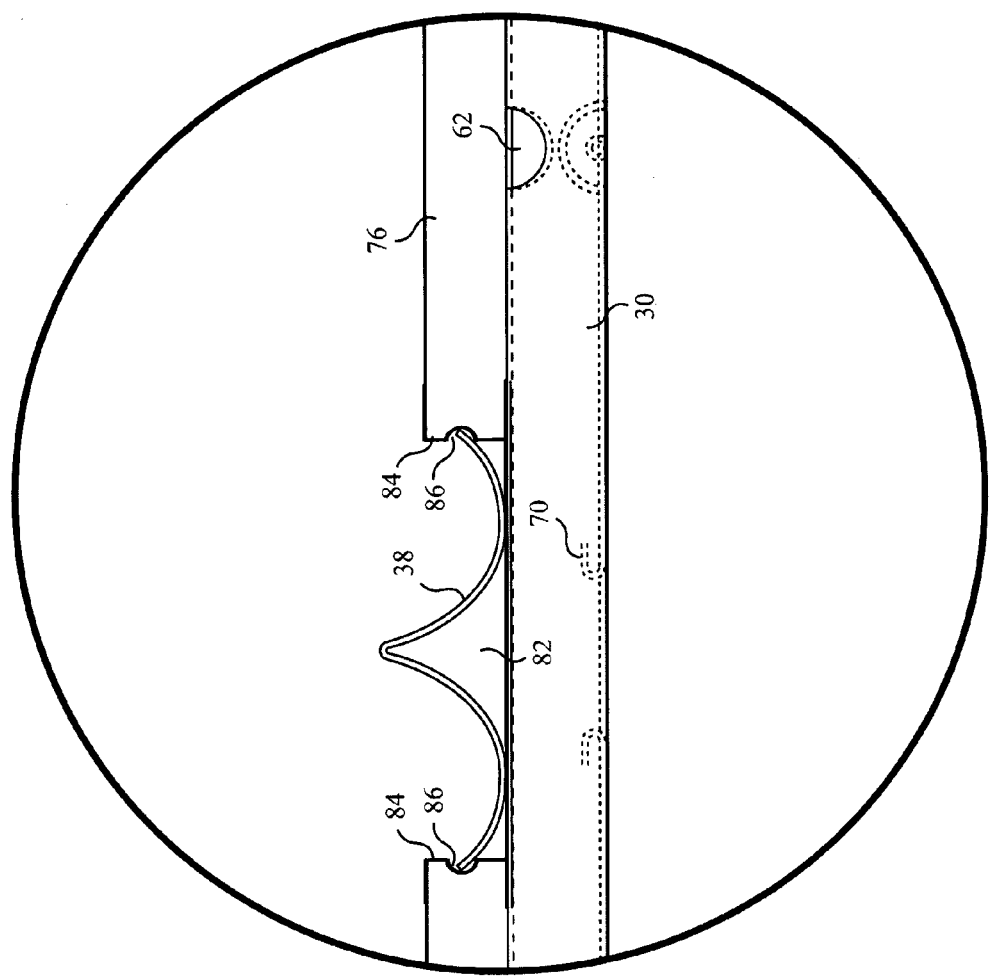
FIG. 23 shows a cross sectional view of the frame element from FIGS. 20-22.

FIGS. 17-23 and especially FIGS. 21-23 show one embodiment of how the baffle members 38 may be supported in the baffle filter 10. In this embodiment, the baffle members 38 are coupled to the second frame element 30. Of course, it should be appreciated that the baffle members 38 may also be coupled to the first frame element 28 or be coupled to both frame elements 28, 30. Numerous other embodiments may also be used.

In the embodiment shown in FIGS. 17-23, the second frame element 30 includes a plurality of mounting rails 76 which extend longitudinally adjacent to a top side 78 and a bottom side 80 of the second frame element 30. The mounting rails 76 are positioned so that openings 82 are defined between adjacent mounting rails 76 which are sized to receive the baffle members 38 in the manner shown in FIG. 23. Adjacent mounting rails 76 include opposing edges 84 having notches 86 therein. The notches are sized and positioned so that the baffle member 38 can be flexed in the middle and snapped into place with the edges of the baffle member 38 engaging the notches 86. This provides a simple yet robust way to secure the baffle members 38 in the baffle filter 10.

It should be appreciated that numerous other ways may also be used to hold the baffle members 38 in position such as welding, rivets, fasteners, etc. It should also be understood that although the baffle members 38 are provided as separate pieces that are individually coupled in place in the baffle filter 10, in other embodiments, the baffle members 10 may be provided as a single unitary piece which is positioned in the baffle filter.

Figure 24:
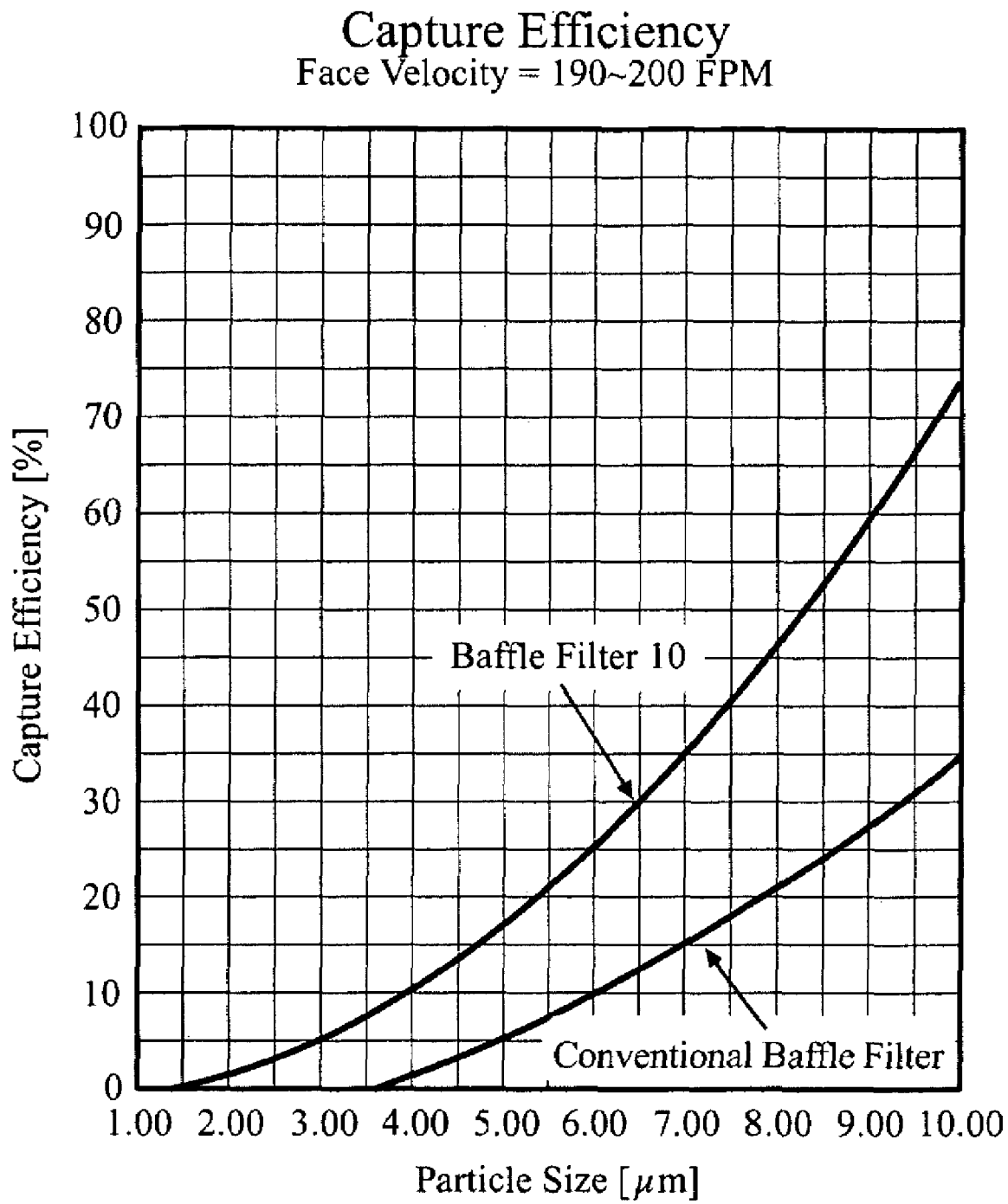
FIG. 24 shows a graph of the capture efficiency of the baffle filter from FIG. 1.

In one embodiment, the baffle filter 10 has a capture efficiency of 7 micron particles that is at least about 20%, or, desirably, at least about 22%, or, suitably, at least about 25%. FIG. 24 shows a graph of the capture efficiency for the baffle filter 10 having a face velocity of about 190 to 200 feet per minute (57.91 m/min to 60.96 m/min). It should be appreciated that the capture efficiency of the baffle filter 10 may be at least about any amount that is 25%, 20%, 15%, or 10% below the amounts shown in the graph (e.g., the baffle filter may have a capture efficiency of 6 micron particles of at least about 18.75%, at least about 20%, at least about 21.25%, or at least about 22.5%).

The capture efficiency may be determined as follows. A kitchen hood having a frequency controlled exhaust fan is used to test the capture efficiency of various grease filters. The kitchen hood has a long section of straight duct exiting the hood to provide uniform air flow. An anemometer (i.e., model # HH751-P2 available from Omega Engineering) and the frequency controlled fan are used to adjust the air flow rate to provide a face velocity of about 190 to 200 feet per minute (58 to 61 meters per minute). An atomizer that produces particles about 0.3 microns to 10 microns is used to atomize oleic acid to create a test aerosol. A baseline is established by measuring the particle size distribution of oleic acid in the air stream using an optical particle counter (i.e., model # 5230 available from HIAC/Royco) without any filters being present in the hood. The optical particle counter is capable of determining the particle size distribution of oleic acid at various particle sizes. The baffle filter is then placed in the hood and the fan adjusted to obtain the same flow rate as the baseline. The particle size distribution of oleic acid particles in the air is measured downstream of the baffle filters and compared to the baseline. The capture efficiency is the percentage of the oleic acid that is captured (i.e., removed from the air stream) by the baffle filter. The pressure drop across the baffle filter is measured using a manometer.

The baffle filter 10 also has a flame length measured from the rear side 16 of the baffle filter of no more than about 16 inches (40.64 cm), no more than about 15 inches (38.1 cm), no more than about 14 inches (35.56 cm), or desirably, no more than about 13 inches (33.02 cm), or suitably no more than about 12 inches (30.48 cm). Conventional baffles may have a flame length of greater than 16 inches (40.64 cm). The flame length were measured according to the Underwriter's Laboratories Standard for Grease Filters for Exhaust Ducts 1046 (UL 1046, third edition, dated Mar. 28, 2000; ISBN 0-7629-0532-8), which is incorporated herein by reference in its entirety.

Figure 25:
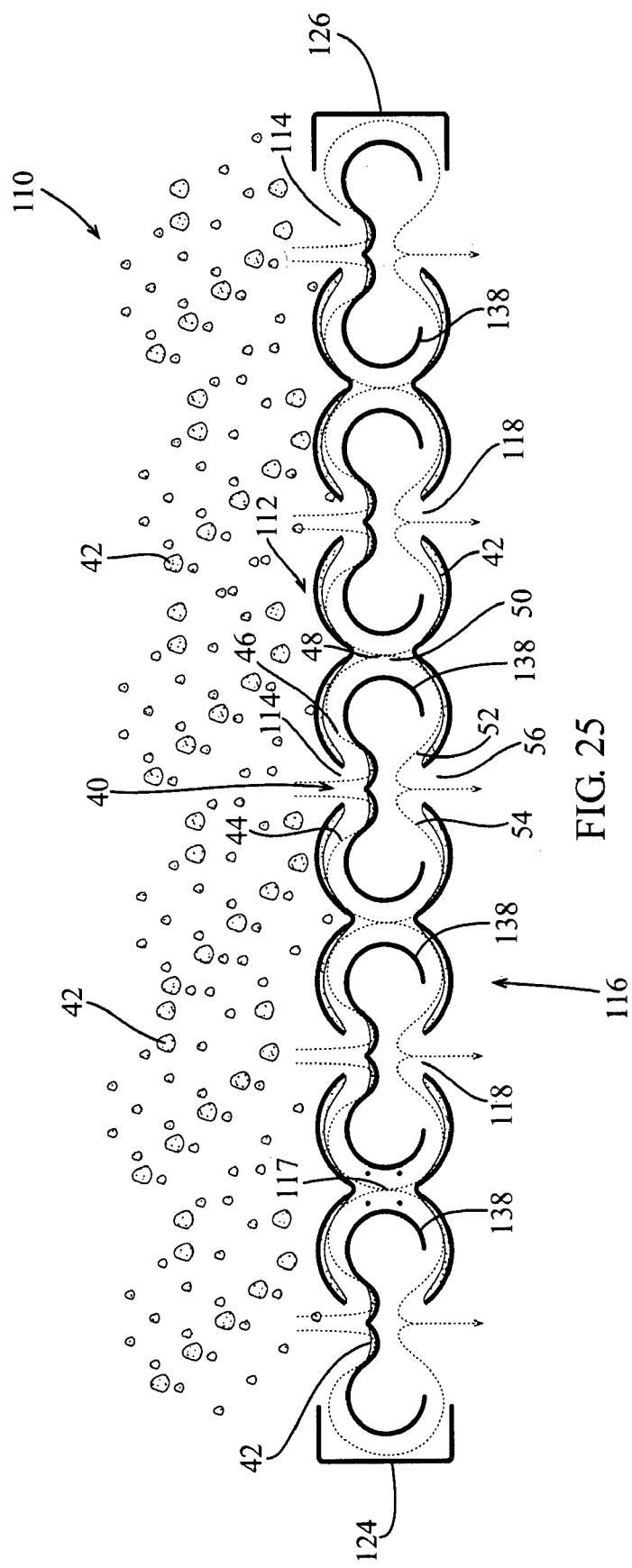
FIG. 25 shows an air flow as it travels through another embodiment of a baffle filter.

Referring to FIG. 25, another embodiment of a baffle filter 110 is shown. The baffle filter 110 includes a front or first side 112 which has a plurality of elongated entry openings 114 and a rear or second side 116 which also has a plurality of elongated exit openings 118. The baffle filter 110 also includes a top side, a bottom side, a first side wall 124, and a second side wall 126. The baffle filter 110 also includes a plurality of baffle members 138 positioned between the front side 112 and the rear side 116. In many ways the baffle filter 110 may be configured similarly to the baffle filter 10. Accordingly, it should be appreciated that much of the description of the baffle filter 10 applies to the description of the baffle filter 110.

As shown in FIG. 25, the front side 112, the rear side 116, and the baffle members 138 are all rounded to varying degrees. The rounded shape directs the flow of air through the baffle filter 110 so that greater centrifugal force is exerted on the impurities 42 which results in the impurities 42 impacting the front side 112, the rear side 116, and the baffle members 138.

The baffle members 138 can be thought of as being generally W shaped since they have two trough areas and three raised areas. Although the ends of the W are heavily rounded to facilitate certain flow characteristics, the general W shape still remains. It should also be appreciated that the front side 112 and the rear side 116 are also W shaped with the middle raised area in each side 112, 116 projecting toward the other side 112, 116. The middle raised area of the W shaped sides 112, 116 is positioned between the baffle members 138 and in the middle of openings 117 defined by the baffle members 138.

It should be appreciated that the baffle members 138 may be configured similarly to the baffle members 38. For example, the baffle members 138 may be provided as part of a baffle elements or as separate pieces. It should be appreciated that much of the discussion related to the baffle members 38 also applies to the baffle members 138. For example, the discussion of how the air flow 40 flows through the baffle filter 10 is also equally applicable to the baffle filter 110.

Figure 26:
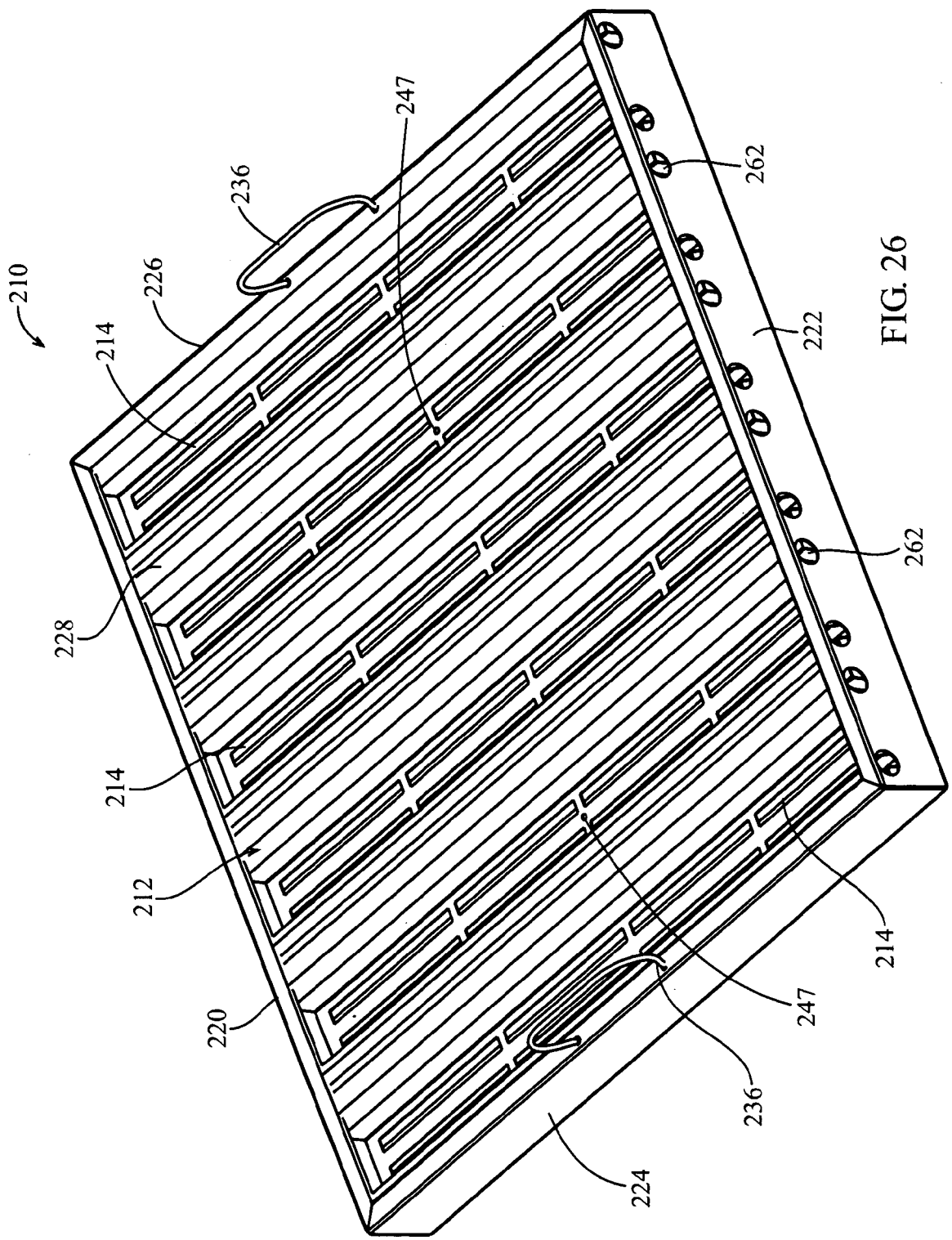
FIGS. 26-28 show an assembled perspective view and various exploded perspective views of another embodiment of a baffle filter.
Figure 27:
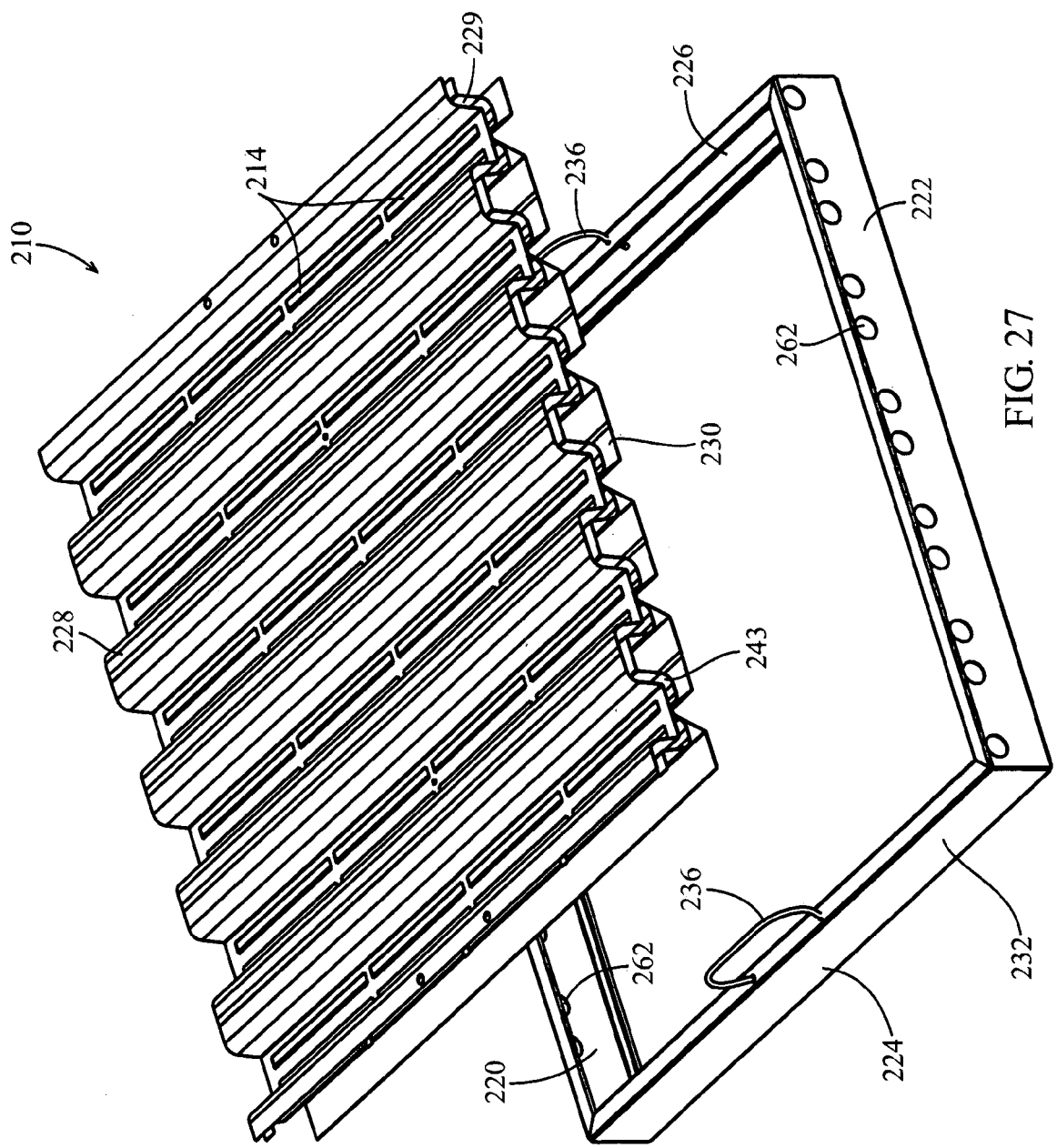
Figure 28:
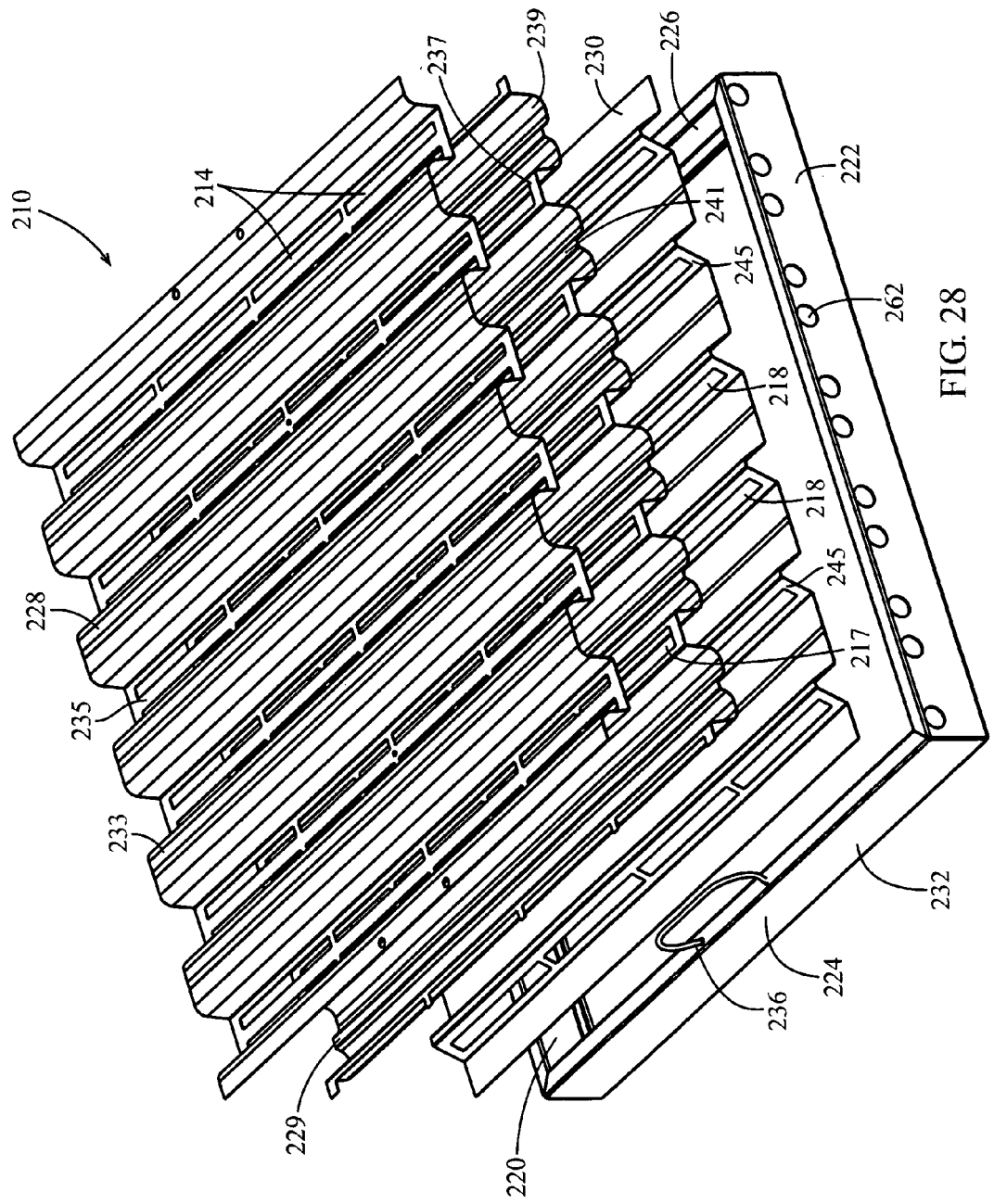

Referring to FIGS. 26-28, various views of another embodiment of a baffle filter 210 are shown. The baffle filter 210 has a front or first side 212 which includes a plurality of elongated entry openings 214 and a rear or second side 216 (FIG. 38) which includes a plurality of elongated exit openings 218. The baffle filter 210 also includes a top side 220, a bottom side 222, a first side wall 224, a second side wall 226, and handles 236. It should be appreciated that much of the description of the baffle filters 10, 110 is also applicable to the baffle filter 210.

Figure 29:
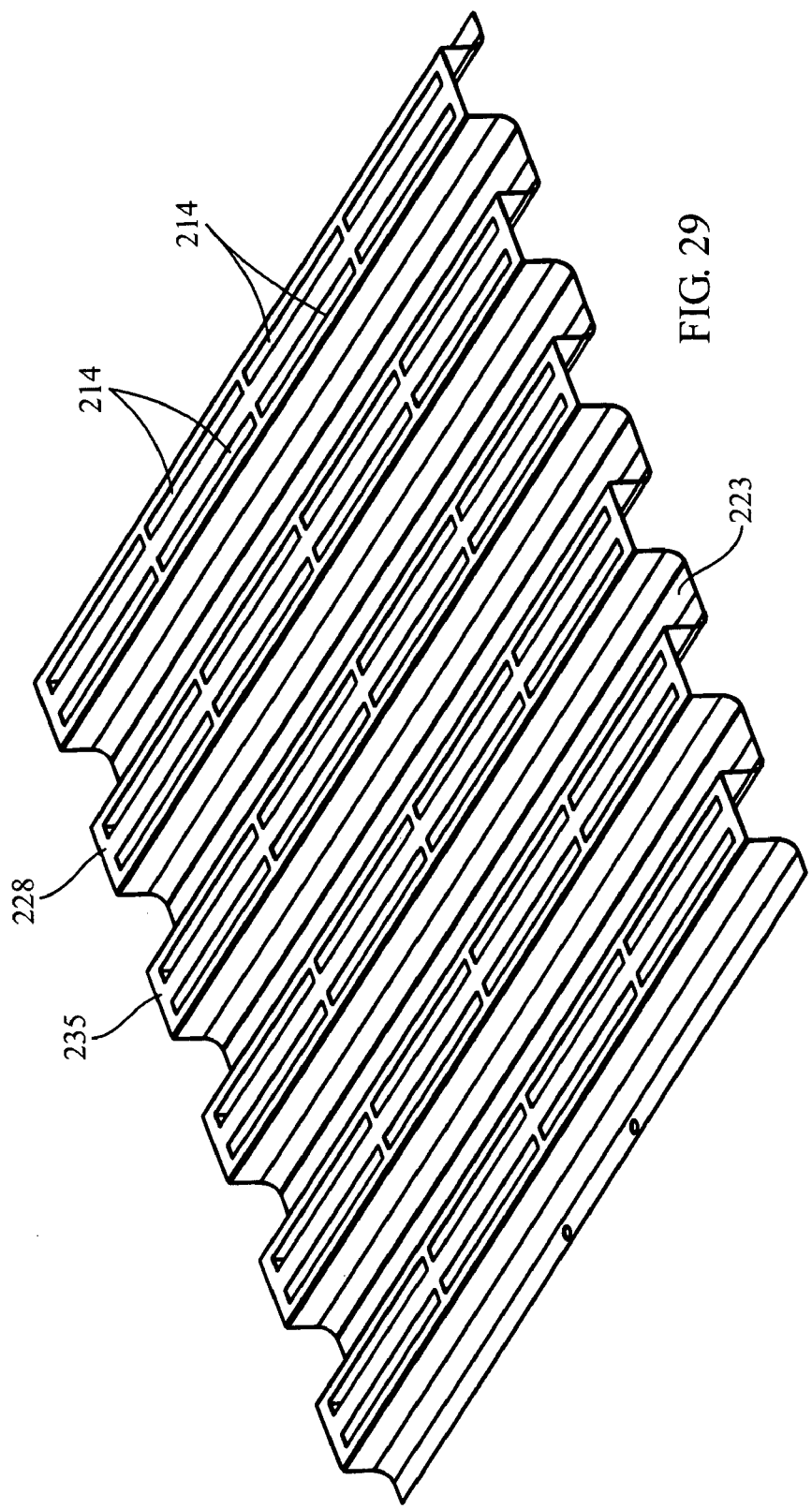
FIG. 29 shows a perspective view of one embodiment of a front plate element used in a baffle filter.
Figure 30:
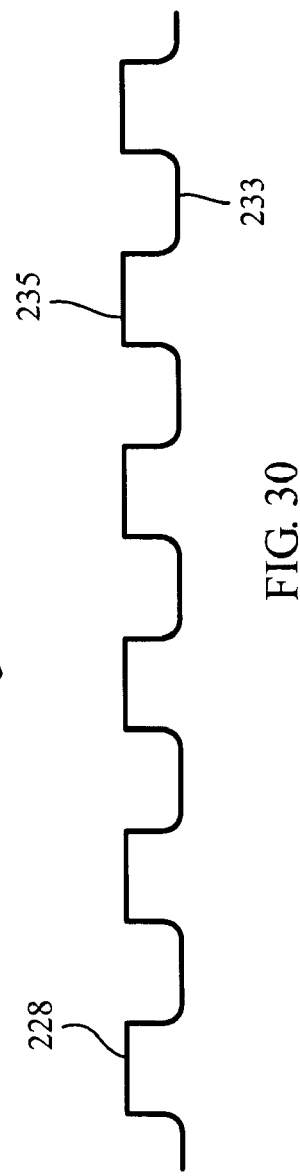
FIG. 30 shows a cross-sectional view of the front plate element from FIG. 29.
Figure 33:
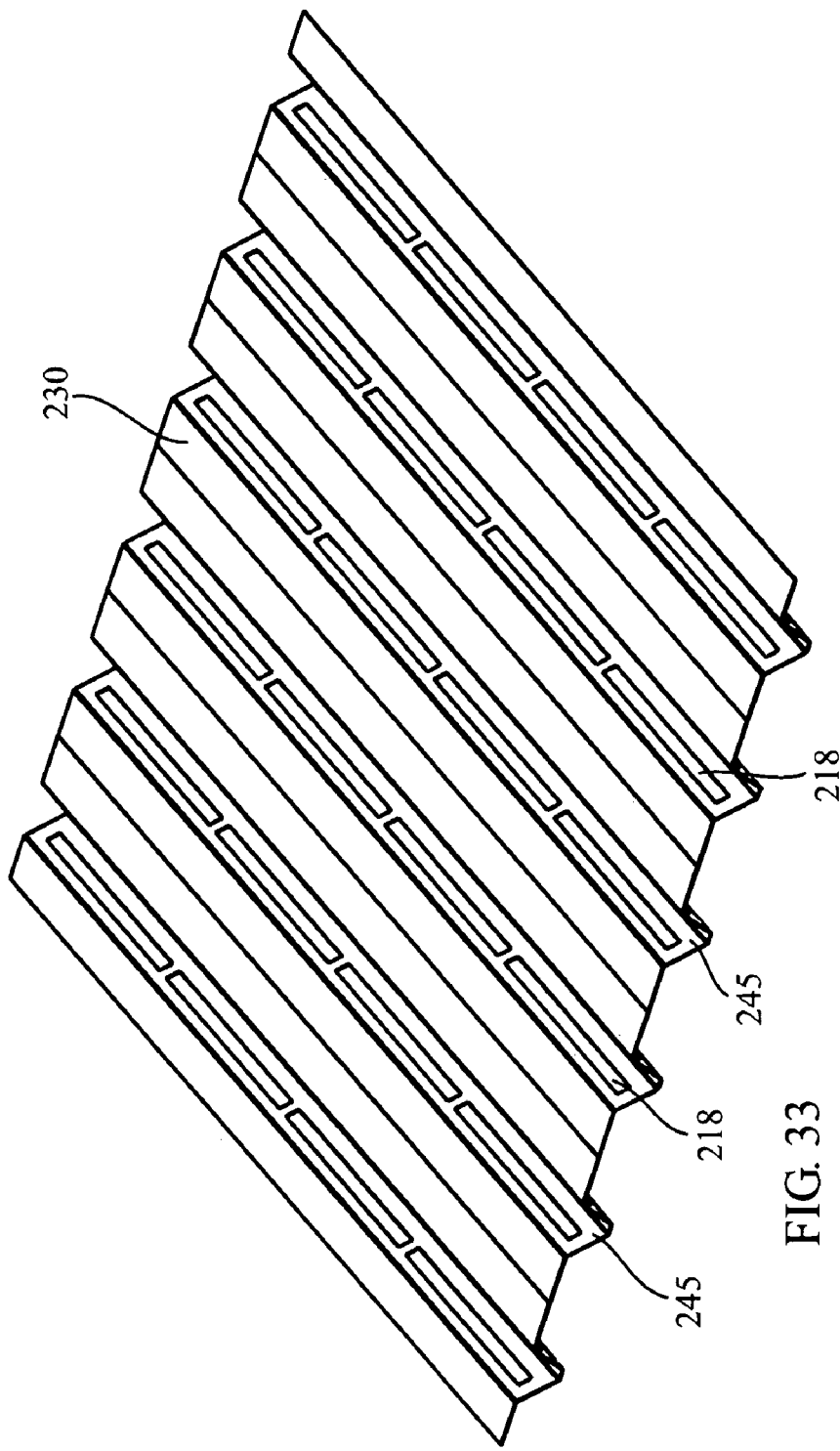
FIG. 33 shows a perspective view of one embodiment of a rear plate element used in a baffle filter.
Figure 34:
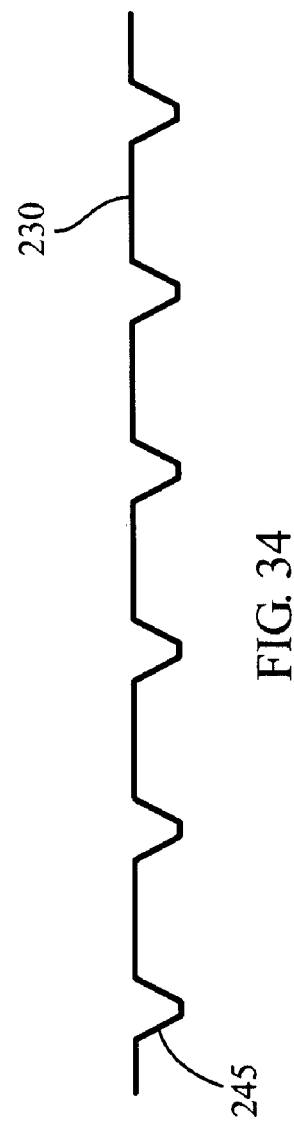
FIG. 34 shows a cross-sectional view of the rear plate element from FIG. 33.

As shown in FIGS. 26-39, the baffle filter 210 includes a front or first plate element 228, a baffle element 229, a rear or second plate element 230, and a frame 232. In the embodiment shown in FIGS. 26-39, the front plate element 228 includes a series of alternating raised portions 233 and troughs or sunken portions 235 (FIGS. 28-30). The baffle element 229 also includes a series of alternating raised portions 237 and troughs or sunken portions 239 (FIGS. 28 and 31-32) that correspond to the raised portions 233 and troughs 235 in the front plate element 228.

The front plate element 228 and the baffle element 229 fit together so that the raised portions 237 in the baffle element 229 fit inside the raised portions 233 of the front plate element 228. The troughs 239 in the baffle element 229 include ridges 241 that protrude outward from the center of the troughs 239 and contact the center of the troughs 235 in the front plate element 228. The ridges 241 are used to support the front plate element 228 in a spaced apart relationship relative to the baffle element 229. Thus, a plurality of channels 243 are formed between the front plate element 228 and the baffle element 229.

The rear plate element 230 is shaped so that it includes a number of projections 245 which extend toward the front side 212 of the baffle filter 210. In one embodiment, the projections 245 may be shaped like a U or a V. It should be appreciated, however, that the projections 245 may have any suitable shape. As best shown in FIGS. 35-36, the bottom of the projections 245 contact the ridges 241 in the baffle element 229. Thus, the projections 245 are used to support the rear plate element 230 in a spaced apart relationship from the baffle element 229. The front plate element 228, the baffle element 229, and the rear plate element 230 may be coupled together in the area of the ridges 241 using any suitable fastener 247 such as a rivet, bolt, screw, and the like.

It should be appreciated that the shape and configuration of the front plate element 228, the baffle element 229, and the rear plate element 230 may vary from the particular shape shown in the drawings. For example, the rear plate element 230 may include additional projections which extend towards the front side 212 of the baffle filter 210 opposite from the openings 17 defined by the baffle element 229. Numerous other changes may also be made.

The baffle element 229 includes a plurality of baffle members 238 which are positioned to deflect the air as it passes through the openings 214 in the front plate element 228. The baffle members 238 can be viewed as having a W shape even though not all of the W shaped portion deflects air (e.g., the ridges 241 do not deflect air in this embodiment since the ridges 241 are positioned behind the solid center portion of the troughs 235 in the front plate element 228). Adjacent baffle members 238 define openings 217. The baffle members 238 may be positioned so that the openings 214 are further inside the baffle filter 210 than the openings 217.

The openings 214, 217, 218 are strategically positioned in the front plate element 228, the baffle element 229, and the rear plate element 230, respectively, so that air passing through the baffle filter 210 must change direction multiple times before exiting. The changes in direction cause the larger, heavier impurities 42 in the air to impinge on the surfaces inside the baffle filter 210. The impurities 42 drain from the baffle filter 210 through openings 262. As shown in FIG. 27, both the top side 220 and the bottom side 222 have openings 262 so that the baffle filter 210 can be used with either side 220, 222 as the bottom.

Figure 38:
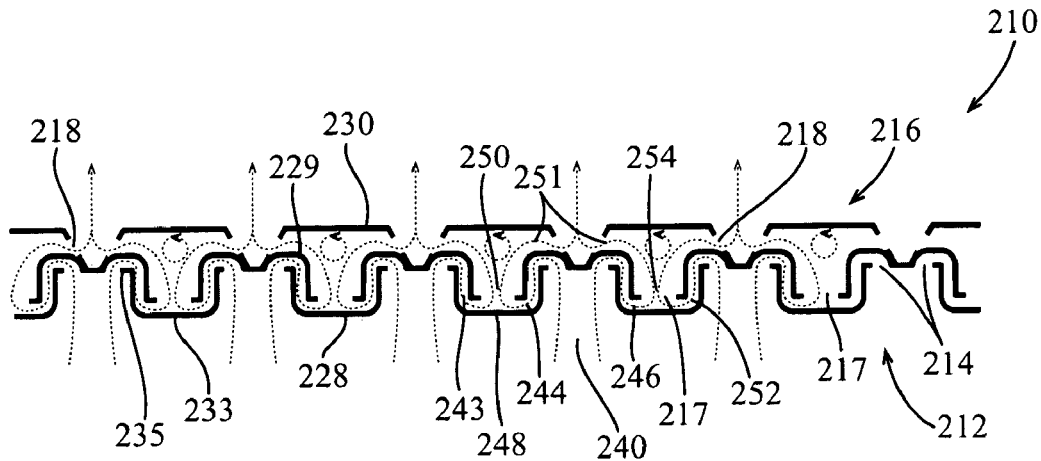
FIG. 38 shows the path air takes as it passes through the baffle filter from FIG. 26.

The openings 214 are positioned in the troughs 235 of the front plate element 228. The openings 217 are positioned in the raised portions 237 of the baffle element 229. The openings 218 are positioned along the sides of the projections 245. As shown in FIG. 38, the openings 218 are positioned opposite the openings 214. Also, since the openings 218 are in the side of the projections 245, the openings 218 are in a different plane than the openings 214 in the front plate element 228. By placing the openings 214 and the openings 218 in different planes, the air is forced to make additional turns in the baffle filter 210. In one embodiment, the openings 214 are in a first plane and the openings 218 are in a second plane. The first plane and the second plane may be offset from each other at least about 15 degrees, at least about 30 degrees, or, desirably, at least about 60 degrees.

The path that the air follows as it flows through the baffle filter 210 can be seen in greater detail with reference to air flow 240 shown in FIG. 38. As the air flow 240 enters the baffle filter 210 through the openings 214 in the front side 212, the air flow 240 is divided into a first air flow 244 and a second air flow 246. The air flows 244, 246 change direction and travel through the channels 243 back towards the front side 212 of the baffle filter 210. The air flows 244, 246 combine with adjacent air flows 248, 252, respectively, to form a third air flow 250 and a fourth air flow 254, which pass through the openings 217 in the baffle element 229. The air flows 250, 254 are each divided into two additional air flows 251 and then exit the baffle filter 210 through the openings 218 in the rear side 216. Since the openings 218 are in the side of the projections 245, the air flows 251 exit through the openings 218 in the rear side 216 of the baffle filter 210 and collide with each other to form another air flow which travels in the same direction as air flow 240.

As shown in FIG. 36, the baffle members 238 may include a number of portions 259 which are positioned between the openings 214, 218 and which are not parallel to either the first side 212 or the second side 216 of the baffle filter 10. Rather, the portions 259 are curved so that the air flow is gradually deflected into the channels 243. The baffle members 238 further include additional wall portions 261 which extend toward the first side 212 of the baffle filter 210 beyond the openings 214. In one embodiment, the wall portions 261 extend past the openings 214 a distance that is at least the same as the depth of the channel 243. The depth 263 of the channel 243 is shown in FIG. 36. Desirably, the wall portions 261 extend past the openings 214 a distance that is at least 1.25 times, at least 1.5 times, or at least 2 times the depth of the channel 243.

Referring to FIG. 36, the radius 272 between the baffle members 238 and the front plate element 228 as the air flows through the channels 243 is shown. It has been found that a smaller radius results in greater capture efficiency. In one embodiment, the radius is no more than about 10 mm, no more than about 8 mm, no more than about 5 mm, or, suitably, no more than about 2.5 mm. It should be appreciated that in some embodiments, the baffle member 238 may not be curved as shown in FIG. 36 so that a smooth radius is not formed between the baffle element 229 and the front plate element 228. In these situations, the radius 272 can still be thought of as the shortest distance between the front plate element 228 and the baffle element 229 in the area where the air flow is being deflected.

Figure 39:
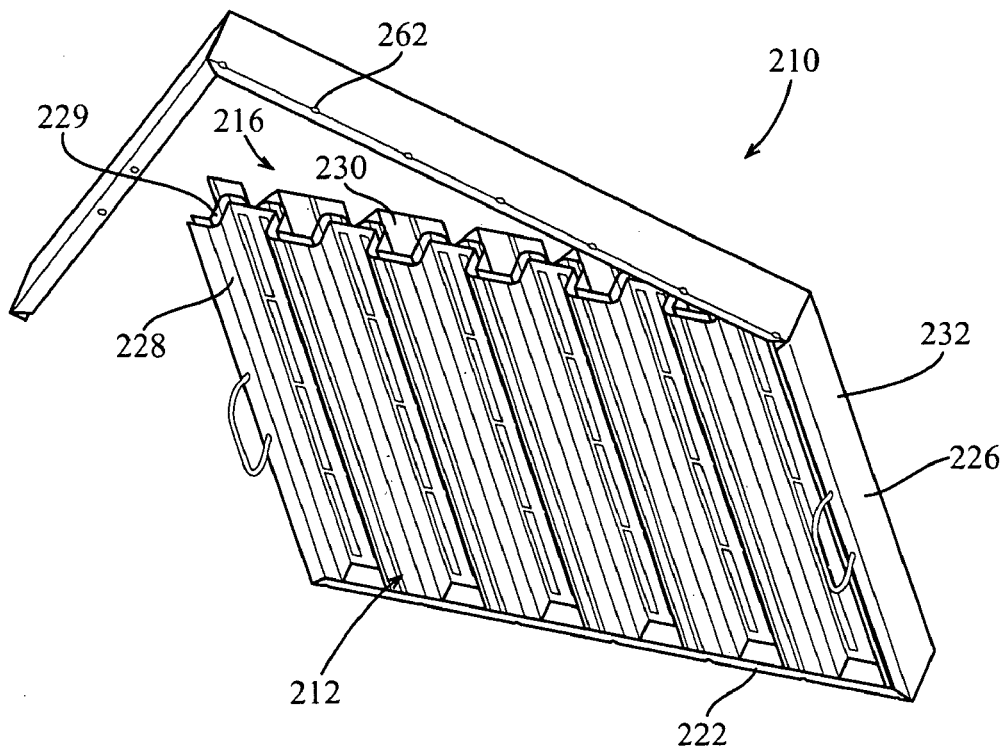
FIG. 39 shows a perspective view of a baffle filter during assembly.
Figure 40:
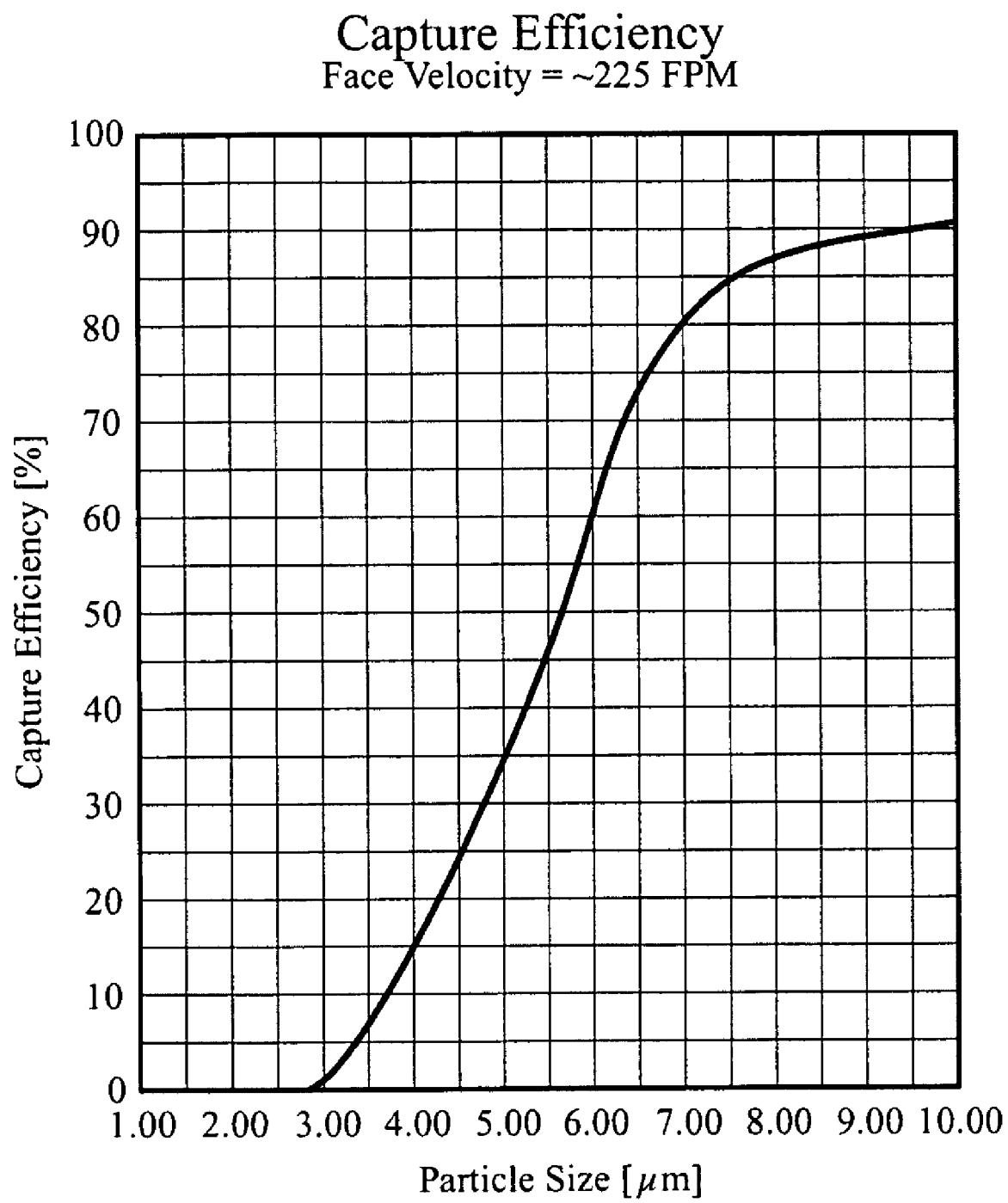
FIG. 40 shows a graph of the capture efficiency of the baffle filter from FIG. 26.

Referring to FIG. 39, the baffle filter 210 may be assembled by coupling or holding the front plate element 228, the baffle element 229, and the rear plate element 230 together. The frame 232 is then wrapped around the elements 228, 229, 230. The frame 232 may be a U-shaped frame that is configured to bend where the corners of the baffle filter 210 are located. In this way, the frame 232 can bend to wrap around the elements 228, 229, 230. The ends of the frame 232 may be coupled together using any suitable fastener or fastening technique (e.g., spot welding, and the like). FIG. 40 shows a graph of the capture efficiency of the baffle filter 210 using a face velocity of about 225 feet per minute (68.58 m/min). The capture efficiency was determined as described previously. It should be appreciated that the capture efficiency of the baffle filter 210 may be at least about any amount that is 25%, 20%, 15%, or 10% below the amounts shown in the graph (e.g., the baffle filter may have a capture efficiency of 6 micron particles of at least about 45%, at least about 48%, at least about 51%, or at least about 54%).

Figure 41:
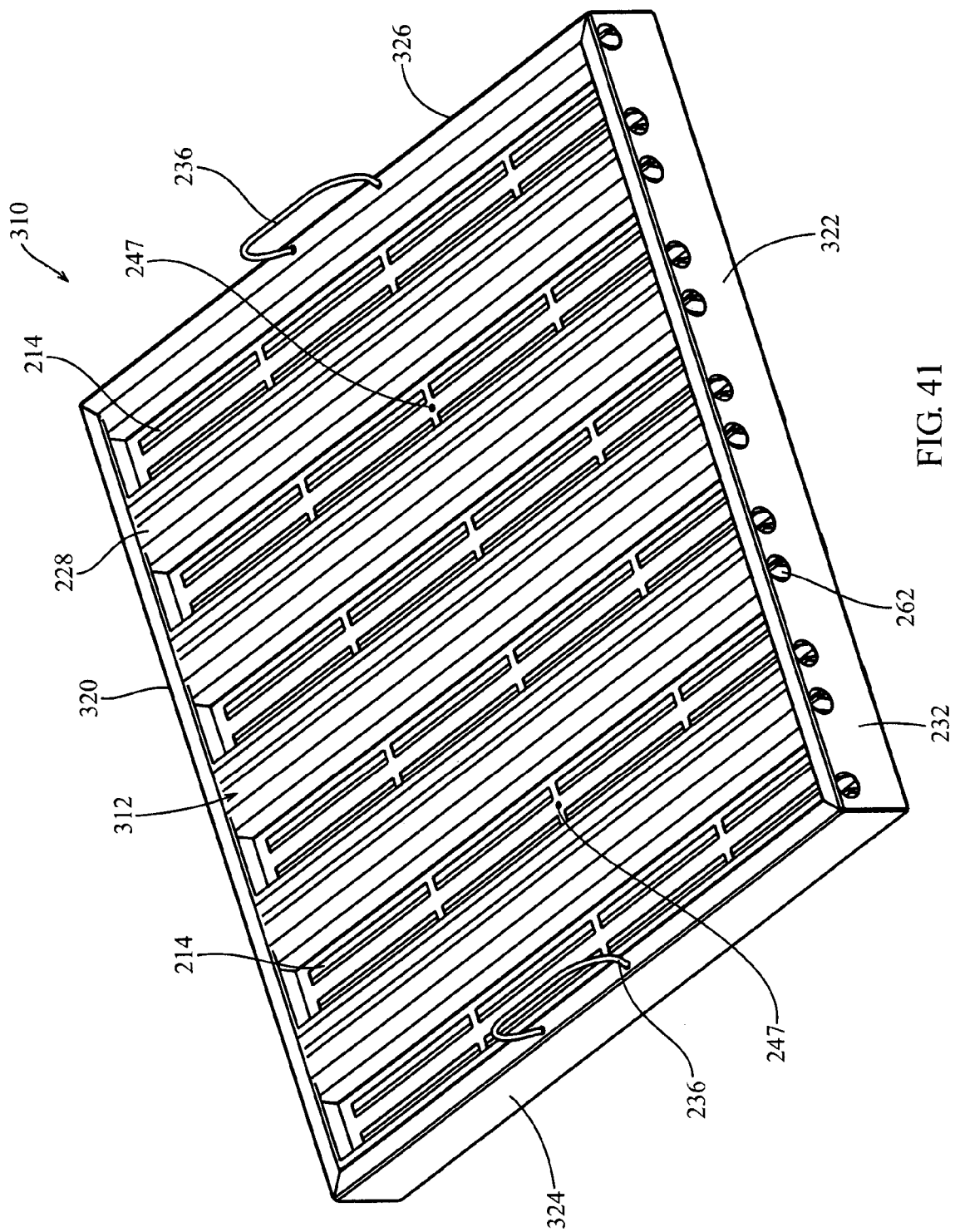
FIGS. 41-43 show an assembled perspective view and various exploded perspective views of another embodiment of a baffle filter.
Figure 42:
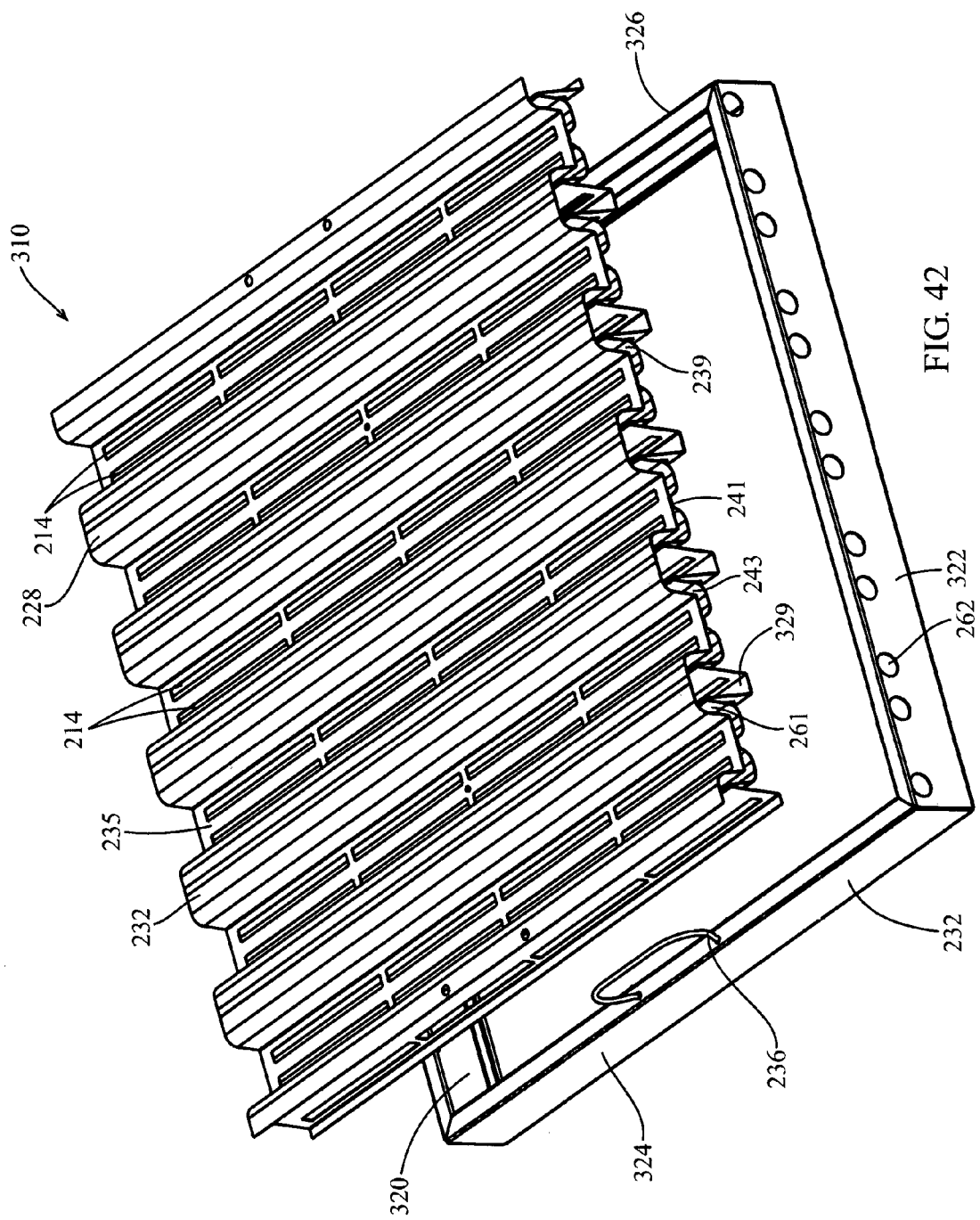
Figure 43:
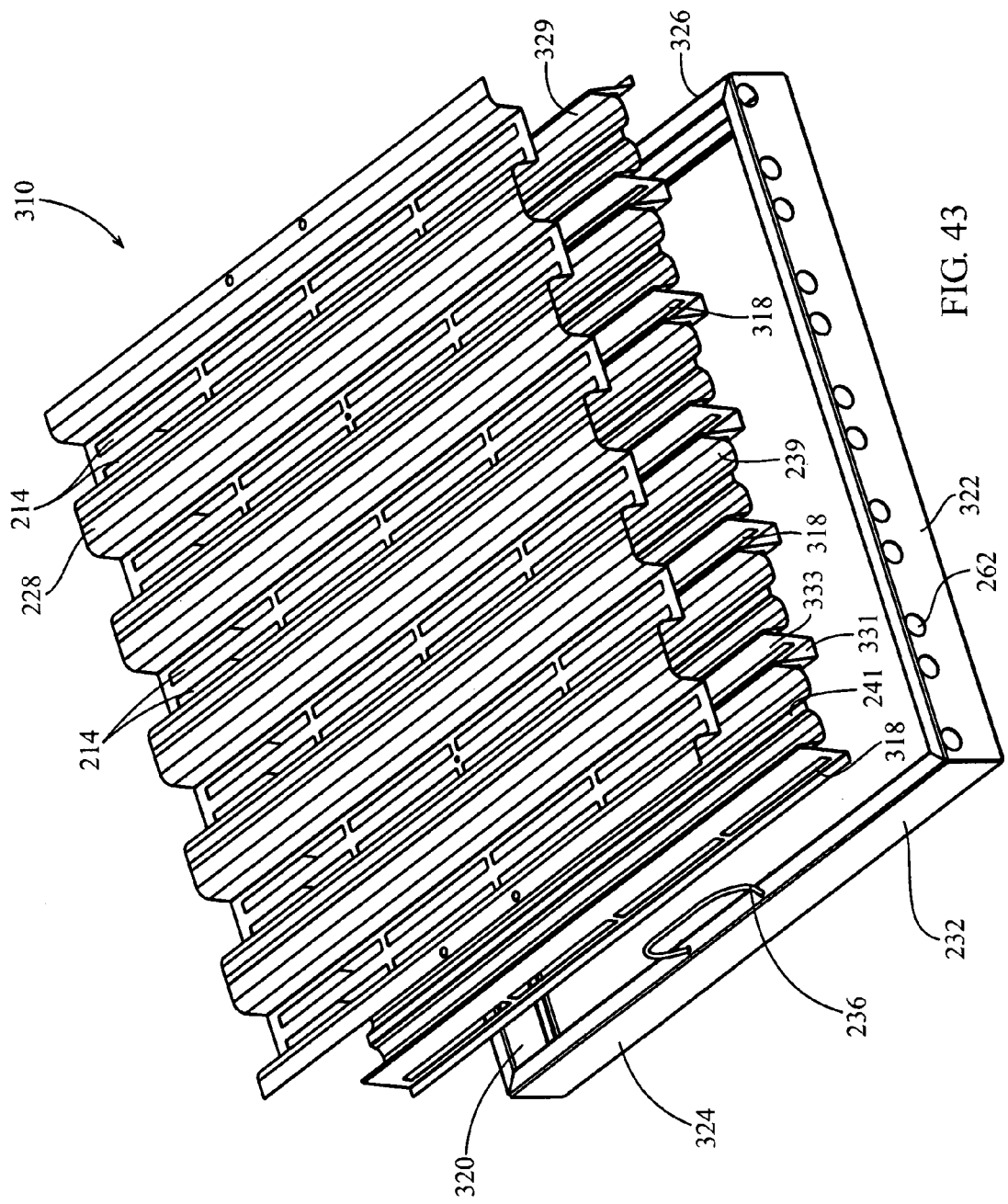

Referring to FIGS. 41-43, various views of another embodiment of a baffle filter 310 are shown. The baffle filter 310 has a front or first side 312 which has a plurality of elongated entry openings 214 and a rear or second side 316 (FIGS. 44-45) which has a plurality of elongated exit openings 318. The baffle filter 310 also includes a top side 320, a bottom side 322, a first side wall 324, a second side wall 326, and handles 236. It should be appreciated that much of the description of the baffle filters 10, 110, 210 is also applicable to the baffle filter 310.

As shown in FIGS. 41-45, the baffle filter 310 includes the front plate element 228, a baffle element 329, and the frame 232. The front plate element 228 and the frame 232 are configured the same as described in connection with the baffle filter 210. Also, the baffle filter 310 may be assembled in the same manner as the baffle filter 210.

Figure 44:
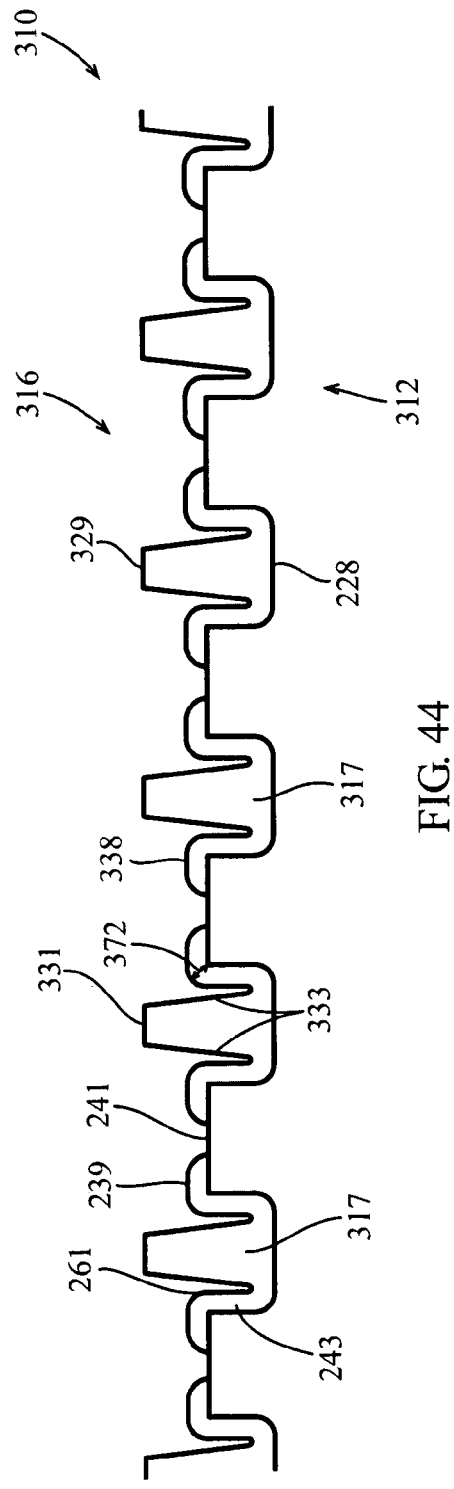
FIG. 44 shows a cross-sectional view of the baffle filter from FIG. 41.
Figure 45:
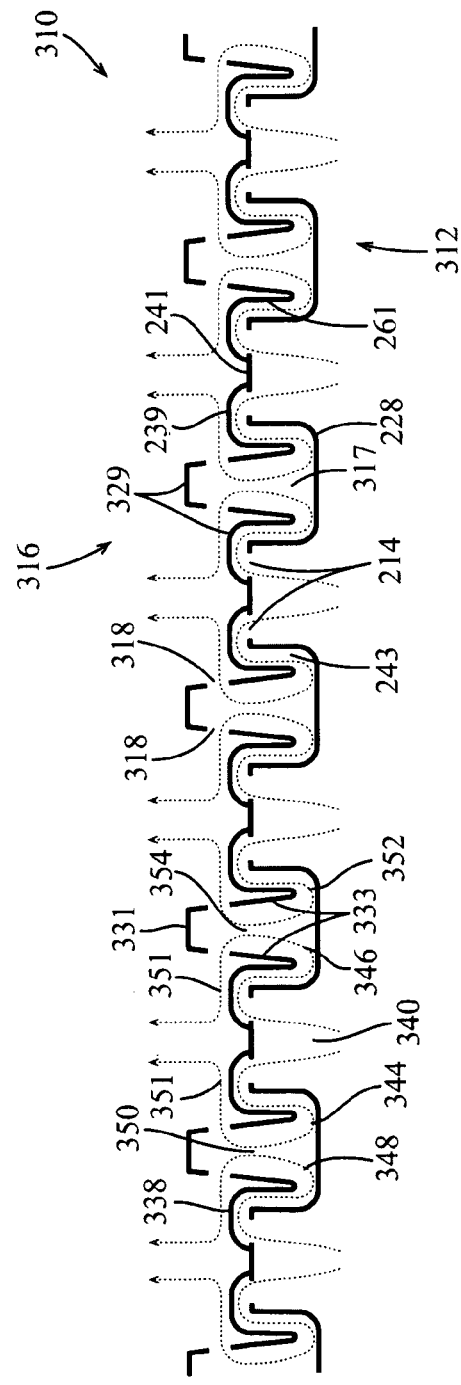
FIG. 45 shows the path air takes as it passes through the baffle filter from FIG. 41.

The baffle element 329 includes the troughs 239 and ridges 241 which are configured as described in connection with the baffle element 229. Wall portions 333 extend backwards from the wall portions 261 towards the rear side 316 of the baffle filter 310 until they reach a base portion 331. As shown in FIGS. 44-45, the combination of the wall portions 333 and base portion 331 may form a U or V shape. The openings 318 are positioned in the wall portions 333 adjacent to the base portion 331.

The baffle element 329 also includes a plurality of baffle members 338. The adjacent baffle members define a plurality of openings 317 and the exit openings 318. Air flows from adjacent baffle members 338 combine at the openings 317 and are divided at the exit openings 318. As shown in FIGS. 42-45, the baffle members 338 may be positioned so that the openings 214 are further inside the baffle filter 310 than the openings 317. Also, the radius 372 between the baffle members 338 and the front plate element 228 as the air flows through the channels 243 may be no more than about 10 mm, no more than about 8 mm, no more than about 5 mm, or, suitably, no more than about 2.5 mm.

The path that the air follows as it flows through the baffle filter 310 can be seen in greater detail with reference to air flow 340 in FIG. 45. As the air flow 340 enters the baffle filter 310 through the openings 214 in the front side 312, the air flow 340 is divided into a first air flow 344 and a second air flow 346. The air flows 344, 346 change direction and travel through the channels 243 back towards the front side 312 of the baffle filter 310. The air flows 344, 346 combine with adjacent air flows 348, 352, respectively, to form a third air flow 350 and a fourth air flow 354, which pass through the openings 317 in the baffle element 329. The air flows 350, 354 are each divided into two additional air flows 351, which exit the baffle filter 310 through the openings 318. Since the openings 318 are in the wall portions 333, the air flows 351 exit through the openings 318 in the rear side 316 of the baffle filter 310 and collide with each other to form another air flow which travels in the same direction as air flow 340.

As shown in FIGS. 42-45, the openings 214 in the front side 312 of the baffle filter 310 are in a different plane than the openings 318 in the rear side 316. As discussed previously, placing the openings 214, 318 in different planes may be desirable to force the air to make additional turns, which results in increasing the capture efficiency and reducing flame length of the baffle filter 310. In one embodiment, the openings 214 are in a first plane and the openings 318 are in a second plane. The first plane and the second plane may be offset from each other at least about 15 degrees, at least about 30 degrees, or, desirably, at least about 60 degrees.

Illustrative Embodiments

According to one embodiment, a grease filter comprises: a first side including a plurality of openings; a second side including a plurality of openings, the plurality of openings in the first side being positioned opposite the plurality of openings in the second side; and a plurality of baffle members positioned between the first side and the second side, the plurality of baffle members defining a plurality of openings which are offset from the plurality of openings in the first side and the plurality of openings in the second side; wherein each opening from the plurality of openings in the second side is defined by an edge that includes a flange which extends toward the inside of the grease filter so that at least a portion of the flange is positioned at an obtuse angle relative to the opening. Each baffle member from the plurality of baffle members may be provided as a separate component. The plurality of baffle members may form at least part of a unitary baffle element. Each one of the plurality of baffle members may be substantially W shaped. The grease filter may comprise a packed bed of particles. Each opening from the plurality of openings in the first side may be defined by an edge that includes a flange which extends toward the inside of the grease filter so that at least a portion of the flange is positioned at an obtuse angle relative to the opening. The grease filter may be configured so that an air flow passing through the grease filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow. The grease filter may comprise a first frame element which includes the first side and a second frame element which includes the second side, the first frame element and the second frame element cooperating to form at least part of the grease filter, wherein each baffle member from the plurality of baffle members is coupled to the second frame element.

According to another embodiment, a grease filter comprises: a first side including a plurality of openings; a second side including a plurality of openings, the plurality of openings in the first side being positioned opposite the plurality of openings in the second side; and a plurality of baffle members positioned between the first side and the second side, the plurality of baffle members defining a plurality of openings which are offset from the plurality of openings in the first side and the plurality of openings in the second side; wherein each baffle member from the plurality of baffle members is provided as a separate component. Each baffle member may be substantially W shaped. The grease filter may comprise a packed bed of particles. Each opening from the plurality of openings in the first side may be defined by an edge that includes a flange which extends toward the inside of the grease filter so that at least a portion of the flange is positioned at an obtuse angle relative to the opening. The grease filter may be configured so that an air flow passing through the grease filter is divided into a first air flow and a second air flow, the first air flow combines with an adjacent air flow to form a third air flow and the second air flow combines with another adjacent air flow to form a fourth air flow, the third air flow and the fourth air flow are each divided into two additional air flows, wherein one of the two additional air flows from the third air flow combines with one of the two additional air flows from the fourth air flow to form a fifth airflow. The grease filter may comprise a first frame element which includes the first side and a second frame element which includes the second side, the first frame element and the second frame element cooperating to form at least part of the grease filter, wherein each baffle member from the plurality of baffle members is coupled to the second frame element.

According to another embodiment, a filter comprises: a first side including a plurality of openings; a second side including a plurality of openings, the plurality of openings in the first side being positioned opposite the plurality of openings in the second side; and a plurality of baffle members each of which is positioned between an opening from the plurality of openings in the first side and a corresponding opening from the plurality of openings in the second side; wherein each of the plurality of baffle members is shaped so that at least a portion is positioned between the opening in the first side and the corresponding opening in the second side and is not parallel to either the first side or the second side. Each opening from the plurality of openings in the second side may be defined by an edge that includes a flange which extends toward the inside of the filter so that at least a portion of the flange is positioned at an obtuse angle relative to the opening. Each opening from the plurality of openings in the first side may be defined by an edge that includes a flange which extends toward the inside of the filter so that at least a portion of the flange is positioned at an obtuse angle relative to the opening. Each baffle member from the plurality of baffle members may be provided as a separate component. The plurality of baffle members may form at least part of a baffle element. The filter may be configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow. The filter may comprise a packed bed of particles. The filter may comprise a first frame element which includes the first side and a second frame element which includes the second side, the first frame element and the second frame element cooperating to form at least part of the filter, wherein each baffle member from the plurality of baffle members is coupled to the second frame element. Each baffle member may be substantially W shaped.

According to another embodiment, a filter comprises: a first side including a plurality of openings; a second side including a plurality of openings, the plurality of openings in the first side being positioned opposite the plurality of openings in the second side; and a plurality of baffle members positioned between the first side and the second side, the plurality of baffle members defining a plurality of openings which are offset from the plurality of openings in the first side and the plurality of openings in the second side; wherein the plurality of openings in the first side are positioned further inside the filter than the plurality of openings defined by the plurality of baffle members. Each baffle member from the plurality of baffle members may be provided as a separate component. The plurality of baffle members may form at least part of a baffle element. Each of the plurality of baffle members may be substantially W shaped and positioned so that the raised portions that represent the sides of the W extend past a corresponding opening from the plurality of openings in the first side. The filter may comprise a packed bed of particles. The filter may have a polygonal shape. The filter may be configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow.

According to another embodiment, a filter comprises: a first side including a plurality of openings; a second side including a plurality of openings, the plurality of openings in the first side being positioned opposite the plurality of openings in the second side; and a plurality of baffle members positioned between the first side and the second side; wherein each of the plurality of baffle members includes a first portion and a second portion both of which extend toward the first side, the first portion and the second portion extending beyond a corresponding opening from the plurality of openings in the first side. Each baffle member from the plurality of baffle members may be provided as a separate component. The plurality of baffle members may form at least part of a baffle element. Each of the plurality of baffle members may be substantially W shaped and the first portion and the second portion represent the sides of the W. The filter may comprise a packed bed of particles. The filter may have a polygonal shape. The filter may be configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow.

According to another embodiment, a filter comprises: a first side including a plurality of openings; a second side including a plurality of openings, the plurality of openings in the first side being positioned opposite the plurality of openings in the second side; and a plurality of baffle members positioned between the first side and the second side; wherein each of the plurality of baffle members include a first portion and a second portion both of which extend toward the first side; wherein the filter has a polygonal shape. Each baffle member from the plurality of baffle members may be provided as a separate component. The plurality of baffle members may form at least part of a baffle element. Each of the plurality of baffle members may be substantially W shaped and the first portion and the second portion represent the sides of the W. The filter may comprise a packed bed of particles. The filter may have a rectangular shape. The filter may be configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow.

According to another embodiment, a filter comprises: a first side including a plurality of entry openings which receive air into the filter; and a plurality of baffle members which define a plurality of exit openings where the air exits the filter, the plurality of baffle members being positioned to deflect the air as the air enters the entry openings and divide the air into a first air flow and a second air flow, the first air flow combines with an adjacent air flow to form a third air flow and the second air flow combines with an adjacent air flow to form a fourth air flow, the third air flow and the fourth air flow being divided into two additional air flows before exiting the filter through the plurality of exit openings. The exit openings may be positioned in a different plane than the entry openings. The plurality of baffle members may form at least part of a baffle element. Each of the plurality of baffle members may extend toward the first side past a corresponding entry opening from the plurality of entry openings to form a channel through which the air travels, and wherein each of the plurality of baffle members extends past the corresponding entry opening a distance that is at least the same as the depth of the channel. The filter may comprise a packed bed of particles. The filter may comprise a first plate element which forms at least a portion of the first side and includes the plurality of entry openings; a baffle element which includes the plurality of baffle members; and a frame which holds the first plate element and the baffle element together to form the filter.

According to another embodiment, a filter comprises: a first side including a plurality of entry openings which receive air into the filter, the entry openings being in a first plane; and a plurality of baffle members which define a plurality of exit openings where the air exits the filter, the exit openings being in a second plane which is different from the first plane, the plurality of baffle members being positioned to deflect the air as the air enters the entry openings. The second plane may be at least fifteen degrees offset from the first plane. The second plane may be at least thirty degrees offset from the first plane. The plurality of baffle members may be positioned to divide the air into a first air flow and a second air flow, the first air flow combining with an adjacent air flow to form a third air flow and the second air flow combining with an adjacent air flow to form a fourth air flow, the third air flow and the fourth air flow being divided into two additional air flows before exiting the filter through the plurality of exit openings The plurality of baffle members may form at least part of a baffle element. Each of the plurality of baffle members may extend toward the first side past a corresponding entry opening from the plurality of entry openings to form a channel through which the air travels, and wherein each of the plurality of baffle members extends past the corresponding entry opening a distance that is at least the same as the depth of the channel. The filter may comprise a packed bed of particles. The filter may comprise a first plate element which forms at least a portion of the first side and includes the plurality of entry openings; a baffle element which includes the plurality of baffle members; and a frame which holds the first plate element and the baffle element together to form the filter.

According to another embodiment, a filter comprises: a first side including a plurality of entry openings; and a plurality of baffle members positioned to deflect air as the air enters the entry openings; wherein each of the plurality of baffle members extends toward the first side past a corresponding entry opening from the plurality of entry openings to form a channel through which the air travels; and wherein each of the plurality of baffle members extends past the corresponding entry opening a distance that is at least the same as the depth of the channel. The plurality of baffle members may define a plurality of exit openings where the air exits the filter. The exit openings may be positioned in a different plane than the entry openings. The plurality of baffle members may be positioned to divide the air into a first air flow and a second air flow, the first air flow combining with an adjacent air flow to form a third air flow and the second air flow combining with an adjacent air flow to form a fourth air flow, the third air flow and the fourth air flow being divided into two additional air flows before exiting the filter. The plurality of baffle members may form at least part of a baffle element. The filter may comprise a second side including a plurality of exit openings, the plurality of entry openings in the first side being positioned opposite the plurality of exit openings in the second side, wherein each of the plurality of baffle members is positioned between an entry opening from the plurality of entry openings and a corresponding exit opening from the plurality of exit openings. The filter may comprise a packed bed of particles. The filter may comprise a first plate element which forms at least a portion of the first side and includes the plurality of entry openings; a baffle element which includes the plurality of baffle members; and a frame which holds the first plate element and the baffle element together to form the filter.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., consensus definitions from widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A filter comprising:
a first side including a plurality of entry openings; and
a plurality of baffle members positioned to deflect air as the air enters the entry openings;
wherein each of the plurality of baffle members extends toward the first side past a corresponding entry opening from the plurality of entry openings to form a channel through which the air travels; and
wherein each of the plurality of baffle members extends past the corresponding entry opening so that each of the plurality of baffle members is positioned closer to the first side than the corresponding entry opening and so that the difference between a distance from each of the plurality of baffle members to the first side and a distance from the corresponding entry opening to the first side is at least the same as the depth of the channel; and
wherein the air that passes through the filter is divided into a first air flow and a second air flow, the first air flow combining with an adjacent air flow to form a third air flow and the second air flow combining with an adjacent air flow to form a fourth air flow, the third air flow and the fourth air flow each being divided into two additional air flows before exiting the filter.

2. The filter of claim 1 wherein the plurality of baffle members define a plurality of exit openings where the air exits the filter.

3. The filter of claim 2 wherein the exit openings are positioned in a different plane than the entry openings.

4. The filter of claim 1 wherein the plurality of baffle members are positioned to divide the air into the first air flow and the second air flow.

5. The filter of claim 1 wherein the plurality of baffle members form at least part of a baffle element.

6. The filter of claim 1 comprising a second side including a plurality of exit openings, the plurality of entry openings in the first side being positioned opposite the plurality of exit openings in the second side, wherein each of the plurality of baffle members is positioned between an entry opening from the plurality of entry openings and a corresponding exit opening from the plurality of exit openings.

7. The filter of claim 1 comprising a packed bed of particles.

8. The filter of claim 1 comprising:
a first plate element which forms at least a portion of the first side and includes the plurality of entry openings;
a baffle element which includes the plurality of baffle members; and
a frame which holds the first plate element and the baffle element together to form the filter.

9. A filter comprising:
a first side including a plurality of openings;
a second side including a plurality of openings, the plurality of openings in the first side being positioned opposite the plurality of openings in the second side; and
a plurality of baffle members each of which is positioned between an opening from the plurality of openings in the first side and a corresponding opening from the plurality of openings in the second side;
wherein each of the plurality of baffle members is shaped so that at least a portion is positioned between the opening in the first side and the corresponding opening in the second side and is not parallel to either the first side or the second side.

10. The filter of claim 9 wherein each opening from the plurality of openings in the second side is defined by an edge that includes a flange which extends toward the inside of the filter so that at least a portion of the flange is positioned at an obtuse angle relative to the opening.

11. The filter of claim 9 wherein each opening from the plurality of openings in the first side is defined by an edge that includes a flange which extends toward the inside of the filter so that at least a portion of the flange is positioned at an obtuse angle relative to the opening.

12. The filter of claim 9 wherein each baffle member from the plurality of baffle members is provided as a separate component.

13. The filter of claim 9 wherein the plurality of baffle members form at least part of a baffle element.

14. The filter of claim 9 wherein the filter is configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow.

15. The filter of claim 9 comprising a packed bed of particles.

16. The filter of claim 9 comprising a first frame element which includes the first side and a second frame element which includes the second side, the first frame element and the second frame element cooperating to form at least part of the filter, wherein each baffle member from the plurality of baffle members is coupled to the second frame element.

17. The filter of claim 9 wherein each baffle member is substantially W shaped.

18. A filter comprising:
a first side including a plurality of openings;
a second side including a plurality of openings, the plurality of openings in the first side being positioned opposite the plurality of openings in the second side; and
a plurality of baffle members positioned between the first side and the second side, the plurality of baffle members defining a plurality of openings which are offset from the plurality of openings in the first side and the plurality of openings in the second side;
wherein the plurality of openings in the first side are positioned further inside the filter than the plurality of openings defined by the plurality of baffle members.

19. The filter of claim 18 wherein each baffle member from the plurality of baffle members is provided as a separate component.

20. The filter of claim 18 wherein the plurality of baffle members form at least part of a baffle element.

21. The filter of claim 18 wherein each of the plurality of baffle members is substantially W shaped and positioned so that the raised portions that represent the sides of the W extend past a corresponding opening from the plurality of openings in the first side so that the raised portions are positioned closer to the first side than the corresponding opening.

22. The filter of claim 18 comprising a packed bed of particles.

23. The filter of claim 18 wherein the filter has a polygonal shape.

24. The filter of claim 18 wherein the filter is configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow.

25. A filter comprising:
   a first side including a plurality of openings;
   a second side including a plurality of openings, the plurality of openings in the first side being positioned opposite the plurality of openings in the second side; and
   a plurality of baffle members positioned between the first side and the second side;
   wherein each of the plurality of baffle members includes a first portion and a second portion both of which extend toward the first side, the first portion and the second portion extending beyond a corresponding opening from the plurality of openings in the first side.

26. The filter of claim 25 wherein each baffle member from the plurality of baffle members is provided as a separate component.

27. The filter of claim 25 wherein the plurality of baffle members form at least part of a baffle element.

28. The filter of claim 25 wherein each of the plurality of baffle members is substantially W shaped and the first portion and the second portion represent the sides of the W.

29. The filter of claim 25 comprising a packed bed of particles.

30. The filter of claim 25 wherein the filter has a polygonal shape.

31. The filter of claim 25 wherein the filter is configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow.

32. A filter comprising:
   a first side including a plurality of openings;
   a second side including a plurality of openings, the plurality of openings in the first side being positioned opposite the plurality of openings in the second side; and
   a plurality of baffle members positioned between the first side and the second side;
   wherein each of the plurality of baffle members includes a first portion and a second portion both of which extend toward the first side;
   wherein the filter has a polygonal shape.

33. The filter of claim 32 wherein each baffle member from the plurality of baffle members is provided as a separate component.

34. The filter of claim 32 wherein the plurality of baffle members form at least part of a baffle element.

35. The filter of claim 32 wherein each of the plurality of baffle members is substantially W shaped and the first portion and the second portion represent the sides of the W.

36. The filter of claim 32 comprising a packed bed of particles.

37. The filter of claim 32 wherein the filter has a rectangular shape.

38. The filter of claim 32 wherein the filter is configured so that an air flow passing through the filter is divided into a first air flow and a second air flow, the first air flow combines with an adjacent air flow to form a third air flow and the second air flow combines with another adjacent air flow to form a fourth air flow, the third air flow and the fourth air flow each being divided into two additional air flows, wherein one of the two additional air flows from the third air flow combines with one of the two additional air flows from the fourth air flow to form a fifth airflow.

39. The filter of claim 1 comprising a plurality of exit openings where the air exits the filter, wherein the plurality of exit openings are positioned in a different plane than the plurality of entry openings.

40. The filter of claim 18 wherein the plurality of openings in the first side are positioned in a different plane than the plurality of openings in the second side.

* * * * *